United States Patent
Rowlette et al.

(10) Patent No.: US 10,054,782 B2
(45) Date of Patent: Aug. 21, 2018

(54) INFRARED SPECTROSCOPIC IMAGING MICROSCOPE WITH AN ATTENUATED TOTAL REFLECTION IMAGING SUB-ASSEMBLY

(71) Applicant: DAYLIGHT SOLUTIONS, INC., San Diego, CA (US)

(72) Inventors: Jeremy Rowlette, Escondido, CA (US); Eric Kim, San Diego, CA (US)

(73) Assignee: DAYLIGHT SOLUTIONS, INC, San Diego, CA (US)

( * ) Notice: Subject to any disclaimer, the term of this patent is extended or adjusted under 35 U.S.C. 154(b) by 156 days.

(21) Appl. No.: 15/270,676

(22) Filed: Sep. 20, 2016

(65) Prior Publication Data

US 2017/0082846 A1  Mar. 23, 2017

Related U.S. Application Data

(60) Provisional application No. 62/222,028, filed on Sep. 22, 2015.

(51) Int. Cl.
| | |
|---|---|
| *G02B 21/36* | (2006.01) |
| *H04N 5/33* | (2006.01) |
| *G02B 21/34* | (2006.01) |
| *G02B 21/06* | (2006.01) |
| *G02B 27/56* | (2006.01) |
| *G02B 21/02* | (2006.01) |
| *G02B 21/26* | (2006.01) |
| *G02B 7/00* | (2006.01) |

(52) U.S. Cl.
CPC ........... *G02B 21/361* (2013.01); *G02B 7/003* (2013.01); *G02B 21/02* (2013.01); *G02B 21/06* (2013.01); *G02B 21/26* (2013.01); *G02B 21/34* (2013.01); *G02B 21/365* (2013.01); *G02B 27/56* (2013.01); *H04N 5/33* (2013.01)

(58) Field of Classification Search
CPC ...... G02B 21/361; G02B 7/003; G02B 21/02; G02B 21/06; G02B 21/26; G02B 21/34; G02B 21/365; G02B 27/56; H04N 5/33
See application file for complete search history.

(56) References Cited

U.S. PATENT DOCUMENTS

| 9,432,592 B2 | 8/2016 | Weida et al. |
| 2016/0018628 A1 | 1/2016 | Rowlette |
| 2018/0024041 A1* | 1/2018 | Wagner ................. G01N 21/85 |

OTHER PUBLICATIONS

U.S. Appl. No. 15/109,570, filed Jul. 1, 2016, with its entire prosecution and file history.

* cited by examiner

*Primary Examiner* — Huy T Nguyen
(74) *Attorney, Agent, or Firm* — Roeder & Broder LLP; Steven G. Roeder

(57) ABSTRACT

An imaging microscope for spectrally analyzing a sample includes (i) a laser source that generates an interrogation beam; (ii) an attenuated total reflection assembly that includes an ATR crystal and a sample holder that holds the sample in intimate contact with the ATR crystal; (iii) an objective lens assembly that collects a reflected beam and focuses the reflected beam; and (iv) a two dimensional image sensor that receives the focused, reflected beam and captures two dimensional image information that is used to generate an image of the sample, the image sensor being operable in the mid-infrared range.

20 Claims, 18 Drawing Sheets

US 10,054,782 B2

INFRARED SPECTROSCOPIC IMAGING MICROSCOPE WITH AN ATTENUATED TOTAL REFLECTION IMAGING SUB-ASSEMBLY

RELATED APPLICATION

This application claims priority on U.S. Provisional Application Ser. No. 62/222,028, filed Sep. 22, 2015 and entitled "INFRARED SPECTROSCOPIC IMAGING MICROSCOPE WITH AN ATTENUATED TOTAL REFLECTION IMAGING SUB-ASSEMBLY". As far as permitted, the contents of U.S. Provisional Application Ser. No. 62/222,028 are incorporated herein by reference.

BACKGROUND

Almost all materials have a unique mid-infrared spectrum, which describe absorption features that relate to the vibrational modes of chemical moieties within molecules.

SUMMARY

An imaging microscope for spectrally analyzing a sample includes (i) a laser source that generates a coherent interrogation beam having a center wavelength that is in the mid-infrared region; (ii) an attenuated total reflection assembly that includes an ATR crystal and a sample holder that holds the sample in intimate contact with the ATR crystal; wherein the attenuated total reflection assembly receives the interrogation beam and directs the interrogation beam at the ATR crystal at an incidence angle that exceeds a critical angle of the ATR crystal to generate an evanescent wave that enters the sample; wherein the interrogation beam is reflected by the ATR crystal to create a reflected beam that exits the ATR crystal; (iii) an objective lens assembly that collects the reflected beam and focuses the reflected beam, the objective lens assembly include at least one refractive element; and (iv) a two dimensional image sensor that receives the focused, reflected beam and captures two dimensional image information that is used to generate an image of the sample, the image sensor being operable in the mid-infrared range.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
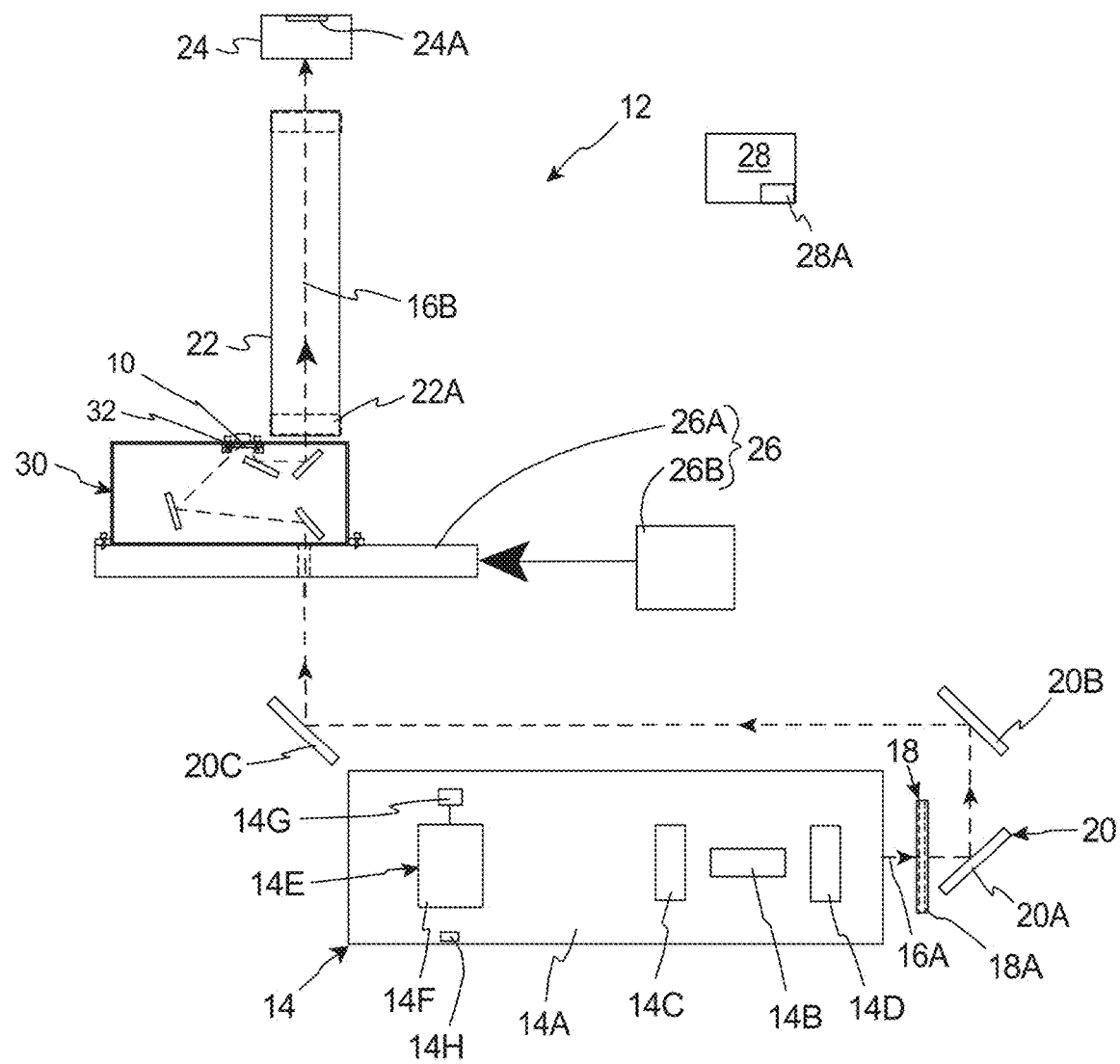
FIG. 1A is a simplified schematic illustration of a sample and an imaging microscope having features of the present invention.

FIG. 1A is simplified schematic illustration of a sample 10, and an imaging microscope 12 that spectrally analyzes a sample 10. In this embodiment, the imaging microscope 12 includes (i) a light source 14, e.g., a laser source, that generates a plurality of interrogation beams 16; (ii) an illumination lens assembly 18; (iii) a beam steerer assembly 20 that steers the interrogation beams 16; (iv) an objective lens assembly 22; (v) a light sensing device 24 that includes an image sensor 24A that senses light in the mid-infrared, spectral region; (vi) a stage assembly 26; (vii) a control system 28 that controls the light source 14 to direct the interrogation beams 16 toward the sample 10; and (viii) an attenuated total reflection ("ATR") assembly 30 (in partial cut-away). It should be appreciated that the imaging microscope 12 can be designed with more or fewer components than those specifically illustrated in FIG. 1A, and/or the components can be organized in another fashion than as illustrated in FIG. 1A.

As provided herein, the imaging microscope 12 uses tunable mid-infrared radiation 16 to rapidly spectrally interrogate and identify one or more characteristics of the sample 10. As an overview, the attenuated total reflection assembly 13 accurately controls the penetration of the interrogation beam 16A into the sample 10 so that the signal level reaching the image sensor 24A will be sufficient to generate accurate images and perform precision spectral measurements on the sample 10.

The design of the imaging microscope 12 can be varied. The imaging microscope 12 can be a mid-infrared imaging microscope. A discussion of some of the components of mid-infrared imaging microscopes are described in PCT Application Serial Nos. PCT/US12/61987, PCT/US14/33878, PCT/US15/11884, and PCT/US15/40052. As far as permitted, the contents of PCT Application Serial Nos.

PCT/US12/61987, PCT/US14/33878, PCT/US15/11884, and PCT/US15/40052 are incorporated herein by reference.

The sample 10 can be a variety of things, including mammalian blood, mammalian blood serum, mammalian cells, mammalian tissue, mammalian biofluids, microorganisms, mammalian blood plasma, and their animal counterparts; plant matter; explosive residues; powders; liquids; solids; inks; and other materials commonly analyzed using spectroscopy and microscopy.

As provided herein, the imaging microscope 12 can be utilized for rapid screening of the sample 10 for the presence of one or more characteristics. As non-exclusive examples, the characteristic can be a disease (e.g. the presence of cancer) and/or other health-related condition of the sample 10. Additionally and/or alternatively, the characteristic can include a property of the sample 10, the composition of the sample 10, and/or the identification of the sample 10. As other examples, the characteristic can be for the presence of explosive residues and/or other dangerous substances.

In certain embodiments, the sample 10 is a relatively thin slice of material. However, because the attenuated total reflection assembly 30 accurately controls the penetration of the interrogation beam 16A into the sample 10, the thickness of the sample 10 is not as critical.

The laser source 14 generates one or more coherent, interrogation beams 16, with each interrogation beam 16A having a center wavelength that is in the mid-infrared spectral region. As utilized herein, the term "mid-infrared spectral region" or "MIR spectral region" shall mean and include the spectral region or spectral band of between approximately two and twenty micrometers (2-20 μm) or wavelengths of between approximately five thousand and five hundred (5000-500 $cm^{-1}$). The MIR spectral range is particularly useful to spectroscopically interrogate the unknown sample since many samples are comprised of molecules or groups of molecules that have fundamental vibrational modes in the MIR range, and thus present strong, unique absorption signatures within the MIR range.

As provided herein, each interrogation beam 16A is nominally monochromatic, and can include one or more pulses of light or a continuous pulse of light. Further, the center wavelength of the interrogation beam 16A can be modulated slightly over time.

The design of the laser source 14 can be varied to suit the specific requirements of the imaging microscope 12 and/or the characteristics of the sample 10 that is to be analyzed. In certain embodiments, the laser source 14 emits the plurality of interrogation beams 16 that is usable for illuminating and analyzing the sample 10. The laser source 14 can include one or more individual lasers, or laser modules, that target a single wavelength or span a portion or all of the desired mid-infrared spectral range.

In one non-exclusive embodiment, the laser source 14 can be an external cavity laser that includes a rigid laser frame 14A, a gain medium 14B, a cavity optical assembly 14C, an output optical assembly 14D, and a wavelength selective ("WS") feedback assembly 14E (e.g., a movable grating). The design of each of these components can be varied to achieve the requirements of the present invention.

In one, non-exclusive embodiment, the gain medium 14B directly emits the interrogation beams 16 without any frequency conversion. As non-exclusive examples, the gain medium 14B can be a Quantum Cascade (QC) gain medium, an Interband Cascade (IC) gain medium, or a mid-infrared diode. Alternatively, another type of gain medium 14B can be utilized. In FIG. 1A, the gain medium 14B includes (i) a first facet that faces the cavity optical assembly 14C and the feedback assembly 14E, and (ii) a second facet that faces the output optical assembly 14D. In this embodiment, the gain medium 14B emits from both facets. In one embodiment, the first facet is coated with an anti-reflection ("AR") coating, and the second facet is coated with a reflective coating. The AR coating allows light directed from the gain medium 14B at the first facet to easily exit as a beam directed at the WS feedback assembly 14E; and allows the light beam reflected from the WS feedback assembly 14E to easily enter the gain medium 14B. The interrogation beams 16 exits from the second facet. The partly reflective coating on the second facet of the gain medium 14B reflects at least some of the light that is directed at the second facet of the gain medium 14B back into the gain medium 14B.

The cavity optical assembly 14C can be positioned between the gain medium 14B and the WS feedback assembly 14E along a lasing axis. The cavity optical assembly 14C collimates and focuses the beam that passes between these components. For example, the cavity optical assembly 14C can include a single lens or more than one lens.

The output optical assembly 14D is positioned between the gain medium 14B and one of the beam steerers 20 in line with the lasing axis to collimate and focus the interrogation beams 16 that exits the second facet of the gain medium 14B. For example, the output optical assembly 14D can include a single lens or more than one lens that are somewhat similar in design to the lens of the cavity optical assembly 14C.

The WS feedback assembly 14E reflects the beam back to the gain medium 14B, and is used to precisely select and adjust the lasing frequency of the external cavity and the center wavelength of the pulses of light. In this design, the interrogation beams 16 may be tuned with the WS feedback assembly 14E without adjusting the gain medium 14B. Thus, with the external cavity arrangement disclosed herein, the WS feedback assembly 14E dictates what wavelength will experience the most gain and thus dominate the wavelength of the interrogation beams 16.

In some embodiments, the WS feedback assembly 14E includes a diffraction grating 14F and a grating mover 14G that selectively moves (e.g., rotates) the diffraction grating 14F to adjust the lasing frequency of the gain medium 14B and the interrogation wavelength of the interrogation beams 16. The diffraction grating 14F can be continuously monitored with an encoder 14H that provides for closed loop control of the grating mover 14G. With this design, the interrogation wavelength of the interrogation beams 16 can be selectively adjusted in a closed loop fashion so that the sample 10 can be imaged at the many different, interrogation wavelengths.

It should be appreciated that laser-based analysis assemblies, such as described herein, can employ a variety of methods to rapidly switch between the plurality of interrogation wavelengths. These include techniques such as rapid tuning mechanisms, galvo-controlled mirrors to switch between different laser modules, or spectral beam combining techniques of multiple laser modules and subsequent time-division multiplexing of laser illumination.

In certain embodiments, the interrogation beams 16 exiting the beam source 14 can be transformed and/or directed toward and impinging on the sample 10, at least in part, with the illumination lens assembly 18. In one embodiment, the illumination lens assembly 18 can include one or more refractive lenses 18A (only one is illustrated in phantom) that transform the interrogation beams 16 and/or assist in directing the interrogation beams 16 at the sample 10. Moreover, the illumination lens assembly 18 can be refractive in the MIR range.

For example, the illumination lens assembly 18 can be utilized to focus and/or adjust the size of the interrogation beams 16, i.e. to increase (magnify) or decrease the size of the interrogation beams 16, so that the interrogation beams 16 has a desired size and beam profile on the sample 10. In certain embodiments, the size of an illuminated area (not shown) of the sample 10 can be tailored to correspond to the design of the light sensing device 24 and the objective lens assembly 22.

As shown in FIG. 1A, the beam steerer assembly 20 can be utilized to steer the interrogation beams 16 so that the interrogation beams 16 is transferred to the ATR assembly 30 as desired. In one non-exclusive embodiment, the interrogation beams 16 can be directed consecutively by a first beam steerer 20A, a second beam steerer 20B and a third beam steerer 20C so that the interrogation beams 16 are directed toward the bottom of the ATR assembly 30 and the stage assembly 26. Alternatively, the plurality of beam steerers 20A-20C can be positioned and/or utilized in a different manner to direct the interrogation beams 16 toward the sample 10.

The design of the beam steerers 20A-20C can be varied. In one embodiment, each of the beam steerers 20A-20C can be a mirror (reflective in the desired wavelength spectrum) which is positioned so as to redirect the path of the interrogation beams 16 by approximately ninety degrees. Alternatively, one or more of the beam steerers 20A-20C can have a different design and/or the beam steerers 20A-20C can be positioned so as to redirect the path of the interrogation beams 16 by greater than or less than approximately ninety degrees. Still alternatively, one or more of the beam steerers 20A-20C can include a curved mirror that conditions the interrogation beams 16 (i) to complement the illumination lens assembly 18, or (ii) to allow for the elimination of a portion or all of the illumination lens assembly 18. Further, the beam steerers 20A-20C may also include one or more electrically controllable angular adjustments.

The objective lens assembly 22 collects a reflected beam 16B that exits the ATR assembly 30 and focuses the reflected beam 16B on the image sensor 24A. Stated in another fashion, the objective lens assembly 22 can collect the reflected beam 16B that exits the ART crystal 32 and can image that light onto the plane in which the light sensing device 26 is positioned. The objective lens assembly include one or more, spaced apart, refractive elements 22A (e.g. lens and only two are illustrated in phantom in FIG. 1A) that are optimized for coherent light, in the MIR spectral range. In this embodiment, the objective lens assembly 22 is a compound refractive objective lens assembly.

In one embodiment, the ATR assembly 30 is uniquely designed so that a working distance between an ATR crystal 32 of the ATR assembly 30, and the objective lens assembly 22 is less than fifty millimeters. In alternative embodiments, the working distance between the ATR crystal 32 of the ATR assembly 30, and the objective lens assembly 22 is less than sixty, seventy, eighty, ninety, or one hundred millimeters.

As used herein, the term "working distance" is the optical path length of the chief ray running between the first element of the objective lens assembly 22 which is closest to the ATR accessory and the sample surface of the ATR crystal 32. As used herein, the term "optical path length" shall mean the product of the index of refraction and the physical distance of any segment along which a light ray propagates.

In one embodiment, the path in the current embodiment is folded and intersects two turning mirrors and traverses the ATR crystal. This allows for the module 30 to fit in the optical path of the microscope 12

In alternative, non-exclusive examples, the objective lens assembly 22 can have a numerical aperture of greater than or equal to 0.15; or a numerical aperture of greater than or equal to 0.3. As more, alternative, non-exclusive examples, the objective lens assembly 22 can have a numerical aperture of greater than or equal to 0.1, 0.2, 0.25, 0.35, or 0.4.

In certain embodiments, the objective lens assembly 22 can include one or more refractive lenses 22A such that the objective lens assembly 22 is optimized for.

The image sensor 24A is a two dimensional sensor array that receives and/or senses reflected beam 16B and generates two dimensional image information that is used by the control system 28 to generate a two dimensional image of the sample 10. As provided herein, the image sensor 24A is operable in the mid-infrared spectral range. More particularly, the light sensing device 24 can be a mid-infrared camera that is sensitive to the mid-infrared spectral region from two to twenty μm. In this embodiment, the image sensor 24A that senses mid-infrared light and converts the infrared light into an array of electronic signals that represents an image of the sample 10. In certain embodiments, the image sensor 24A includes a two-dimensional array of photosensitive elements (pixels) (e.g., a focal plane array (FPA)) that are sensitive to the wavelength of the interrogation beams 16, i.e., that are sensitive to the infrared region of the electromagnetic spectrum. Additionally, the two-dimensional array of pixels can be used to construct a two-dimensional image including the two-dimensional array of data (data at each pixel). The spacing between the pixel elements is referred to as the pitch of the array. As non-exclusive examples, the two-dimensional array can include approximately 640×480; 320×240; 480×480; 80×60; 1080×720; 120×120; 240×240; or 480×640 pixels, with pixel sizes ranging from one micron (μm) up to two hundred microns (μm).

In certain alternative embodiments, the light sensing device 24 and/or the image sensor 24A can have a measurement band that is approximately equal to the entire MIR spectral range; or the light sensing device 24 and/or the image sensor 24A can have a measurement band is approximately equal to a predetermined desired range within the MIR spectral range. Further, in certain embodiments, the light sensing device 24 can block and not sense light outside the desired measurement band. Thus, it should be appreciated that the design of the light sensing device 24 can adjusted to match the desired requirements of the system.

Non-exclusive examples of suitable infrared image sensors 24A include (i) vanadium oxide (VOx) microbolometer arrays such as the FPA in the FLIR Tau 640 infrared camera that are typically responsive in the seven to fourteen μm spectral range; (ii) mercury cadmium telluride (HgCdTe or MCT) arrays such as those in the FLIR Orion SC7000 Series cameras that are responsive in the 7.7 to 11.5 μm spectral range; (iii) indium antimonide (InSb) arrays such as those in the FLIR Orion SC7000 Series cameras that are responsive in the 1.5 to 5.5 μm spectral range; (iv) indium gallium arsenide (InGaAs); (v) uncooled hybrid arrays involving VOx and other materials from DRS that are responsive in the two to twenty μm spectral range; or (vi) any other type of image sensor that is designed to be sensitive to infrared light in the two to twenty μm range and has electronics allowing reading out of each element's signal level to generate a two-dimensional array of image information.

The stage assembly 26 retains the ATR assembly 30 and the sample 10, and can be used to properly position the sample 10 and the ATR assembly 30 relative to the other components of the imaging microscope 12. For example, the stage assembly 26 can include a rigid stage 26A that retains the ATR assembly 30 and sample 10, and a stage mover 26B that selectively moves the stage 26A, the ATR assembly 30, and the sample 10. The stage mover 26B can include one or more actuators. As alternative examples, the stage mover 26B can be designed to move the stage 26A with one, two, three, four, five, or six degrees of motion. Additionally and/or alternatively, the stage 26A can be manually positioned as desired.

The control system 28 controls the various components of the imaging microscope 12 and includes one or more processors 28A and/or electronic data storage devices. For example, the control system 28 can control one or more components of the imaging microscope 12 and/or receive information from the pixels of the image sensor 24A, and generate the images of the sample 10. Additionally, the control system 28 can further be utilized to evaluate the spectral images of the sample 10 at the various interrogation wavelengths to determine if the characteristics of the sample 10.

In alternative, non-exclusive embodiments, the control system 28 can controls the image sensor 24A to capture two dimensional image information at a frame rate of approximately (i) thirty frames per second, (ii) sixty frames per second, or (iii) one hundred and twenty frames per second. Thus, the system provides live spectral imaging.

Further, the control system 28 can control the laser source 14 to modulate the center frequency of the interrogation beam 16A about a target wavelength during the capture of the two dimensional image information that is used to generate the image of the sample 10.

The ATR assembly 30 retains the sample 10 and accurately controls the penetration of the interrogation beam into the sample 10. As a result thereof, the thickness of the sample 10 is not as critical. In FIG. 1A, the ATR assembly 30 receives the interrogation beam 16A from the beam steerer assembly 20 at the bottom, and the reflected beam 16B exits the ATR assembly 30 at the top. However, other designs and orientations are possible.

Figure 1B:
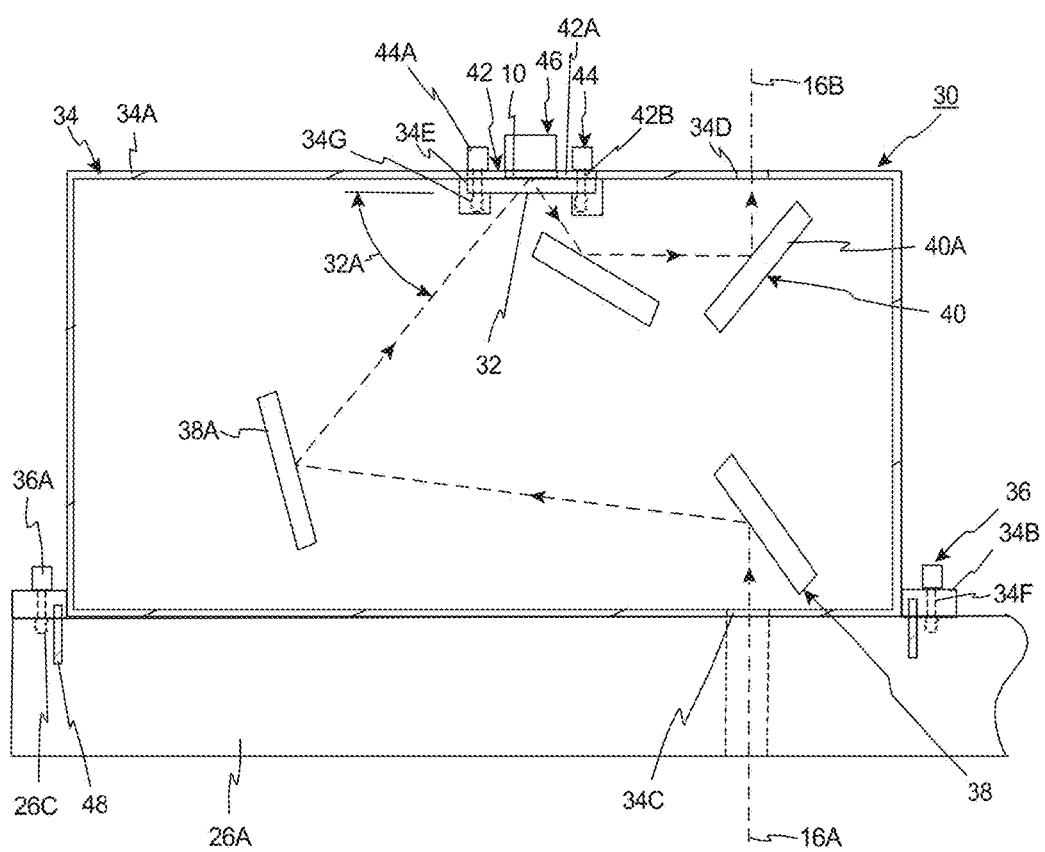
FIG. 1B is a simplified side illustration of the sample and a portion of the imaging microscope in partial cut-away.

FIG. 1B is a simplified illustration of a portion of the stage 26A, the ATR assembly 30 (in partial cut-away), the sample 10, a portion of the interrogation beam 16A, and a portion of the reflected beam 16B from FIG. 1A. In this embodiment, the ATR assembly 30 includes (i) an ATR housing 34; (ii) an assembly retainer 36; (iii) the ATR crystal 32; (iv) an ATR illumination routing assembly 38; (v) an ATR objective routing assembly 40; (vi) a crystal housing module 42; (vii) a crystal module retainer 44; and (viii) a sample holder 46. The design of each of these components can be varied pursuant to the teachings provided herein.

The ATR housing 34 is rigid and defines a hollow chamber that receives and retains many of the components ATR assembly 30. In the non-exclusive embodiment illustrated in FIG. 1B, the ATR housing 34 includes a generally rectangular box shaped housing body 34A and a lower perimeter housing flange 34B that encircles and cantilevers away from the housing body 34A. The housing body 34A includes a lower, input opening 34C for receiving the interrogation beam 16A, an upper, output opening 34D that allows the reflected beam 16B to exit, and a module opening 34E for receiving the crystal housing module 42. Additionally, the housing flange 34B can include one or more flange apertures 34F (two are illustrated in FIG. 1B) for receiving the assembly retainer 36.

The assembly retainer 36 selectively and fixedly secures the ATR assembly 30 to the stage 26A. In one embodiment, the assembly retainer 36 includes one or more assembly fasteners 36A (two are illustrated in FIG. 1B). In this embodiment, each assembly fastener 36A (e.g. a bolt) extends through one of the flange apertures 34F and is threaded into a corresponding internally threaded surface 26C in the stage 26A. With this design, the ATR assembly 30 can be easily secured to the stage 26A (as an ATR module) when desired to be used and subsequently removed (as an ATR module) when it is desired to use the microscope without the ATR assembly 30.

In this embodiment, it should be noted that in certain embodiments, the assembly fasteners 36A act as an alignment feature that aligns the ATR assembly 30 to the stage 26A.

Additionally, ATR assembly 30 can include one or more alignment guides 48 (two are illustrated in FIG. 1B) that extend between the ATR housing 34 and the stage 26A that act as an alignment feature to provide precise alignment between the ATR assembly 30 to the stage 26A. For example, each alignment guide 48 can be a cylindrical pin that extends between the ATR assembly 30 to the stage 26A.

The ATR crystal 32 is in direct contact with the sample 10, and receives the interrogation beam 16A at an incidence angle 32A that exceeds a critical angle of the ATR crystal 32 to generate an evanescent wave that enters the sample 10. In FIG. 1B, the incidence angle 32A is approximately forty-five degrees. However, other incidence angles 32A can be used.

The ATR crystal 32 uses a property of total internal reflection that resulting in an evanescent wave in the sample 10. In the present application, the interrogation beam 16A enters the ATR crystal 32 in such a way that it reflects at least once off an inner surface (or edge) of the ATR crystal 32 that is in contact with the sample 10. This reflection forms the evanescent wave which extends into the sample 10. The depth to which the evanescent wave extends into the sample 10 is generally determined by the wavelength of the interrogation beam 16A, the angle of incidence 32A, and the indices of refraction for the ATR crystal 32, and the particular components of the sample 10 being analyzed. The number of reflections may also be varied by varying the angle of incidence 32A and the indices of refraction for the ATR crystal 32.

The evanescent effect as discussed above only works if the ATR crystal 32 is made of an optical material with a higher refractive index than the sample 10 being studied. In certain non-exclusive alternative embodiments, the materials utilized for the ATR crystal 32 can include diamond, germanium, KRS-5, zinc selenide, or other appropriate materials. Additionally, the shape of the ATR crystal 32 can depend on the type of light source 14 utilized, and the nature of the sample 10 itself. As one non-exclusive example, the ATR crystal 32 can have a triangular shaped cross-section.

The ATR illumination routing assembly 38 receives the interrogation beam 16A from the beam steerer assembly 20 (illustrated in FIG. 1A) and directs the interrogation beam 16A at the ATR crystal 32 at an incidence angle 32A that exceeds a critical angle of the ATR crystal 32. In one non-exclusive embodiment, the ATR illumination routing assembly 38 can include one or more input routing reflectors 38A that redirect the interrogation beam 16A so that it has the desired angle of incidence 32A on the ATR crystal 32. In FIG. 1B, the ATR illumination routing assembly 38 includes two spaced apart input routing reflectors 38A. Alternatively, the ATR illumination routing assembly 38 can be positioned and/or utilized in a different manner. The design of each input routing reflectors 38A can be varied. In one embodiment, each of the input routing reflectors 38A can be a mirror (reflective in the desired wavelength spectrum) which is positioned so as to redirect the path of the interrogation beams 16A at the appropriate angle.

In one embodiment, the optical path created by the input routing reflectors 38A is folded so that the ATR module 30 can fit in an existing microscope 12 setup. Further, in certain embodiments, the ATR module 30 is designed so that the interrogation beam 16A entering the ATR module 30 and the reflected beam 16B exiting the ATR module 30 are coaxial. This allows the ATR module 30 to be inserted into an existing microscope arrangement.

The ATR objective routing assembly 40 receives the reflected beam 16B from the ATR crystal 32 and directs the reflected beam 16B at the objective lens assembly 22. In one non-exclusive embodiment, the ATR objective routing assembly 40 can include one or more output routing reflectors 40A that redirect the reflected beam 16B. In FIG. 1B, the ATR objective routing assembly 40 includes two spaced apart output routing reflectors 40A. Alternatively, the ATR objective routing assembly 40 can be positioned and/or utilized in a different manner. The design of each output routing reflectors 40A can be varied. In one embodiment, each of the output routing reflectors 40A can be a mirror (reflective in the desired wavelength spectrum) which is positioned so as to redirect the path of the reflected beams 16B at the appropriate angle.

In one embodiment, the optical path created by the output routing reflectors 40A is folded so that the ATR module 30 can fit in an existing microscope 12 setup.

The crystal housing module 42 includes a rigid frame 42A that fixedly retains the ATR crystal 32. In one embodiment, the rigid frame 42A includes one or more frame apertures 42B (two are illustrated in FIG. 1B) for receiving the crystal module retainer 44.

The crystal module retainer 44 selectively and fixedly secures the crystal housing module 42, the ATR crystal 32, and the sample 10 to the ATR housing 34. In one embodiment, the crystal module retainer 44 includes one or more module fasteners 44A (two are illustrated in FIG. 1B). In this embodiment, each module fastener 44A (e.g. a bolt) extends through one of the frame apertures 42B and is threaded into a corresponding internally threaded surface 34G in the ATR housing 34. With this design, the crystal housing module 42, the ATR crystal 32, and the sample 10 can be easily secured to the rest of the ATR assembly 30, and subsequently removed (as a module) and replaced when it is desired to use another ATR crystal 30 and/or another sample 10.

The sample holder 46 holds the sample 10 in direct intimate contact with the ATR crystal 32. In certain embodiments, the sample holder 46 provides a distributed, substantially uniform force (applied pressure) across the sample 10. Non-exclusive, suitable sample holders 46 are described in more detail below.

Referring back to FIG. 1A, in certain embodiments, during use of the imaging microscope 12, the spectral resolution and quality of the two-dimensional data of images of the sample 10 can be improved by inhibit various noise sources. For example, in certain applications, it can be desired to increase the apparent linewidth of the excitation source, so as to reduce coherence and, thus, inhibit adverse effects from multiple beam interference, e.g., optical etalons that arise from any pair of points in space that are partly reflective. More particularly, in some such applications, the control system 28 can control the laser source 14 so as to generate an interrogation beam 16A that modulates the wavelength about a target interrogation wavelength. Stated in another fashion, the control system 28 can control the tunable light source 14 to modulate the wavelength of the interrogation beam about and through each respective interrogation wavelength.

Further, a separate image can be generated at individual steps or points during such wavelength modulation to provide a plurality of preliminary images. Subsequently, an output image is determined based on the plurality of preliminary images that have been generated.

Figure 2A:
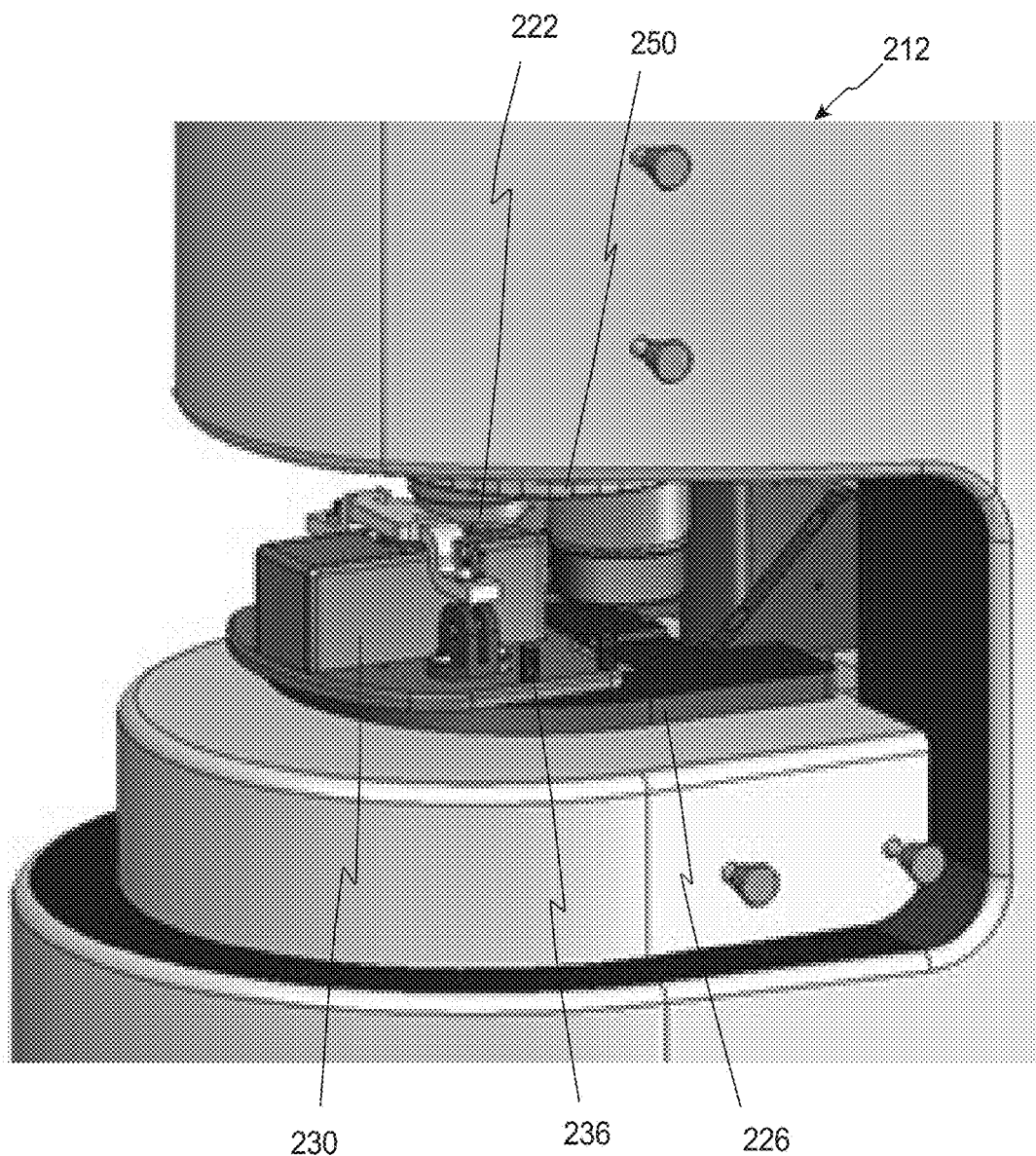
FIG. 2A is partial perspective view of another embodiment of an imaging microscope.

FIG. 2A is partial perspective view of another embodiment of an imaging microscope 212 that is somewhat similar to the imaging microscope 12 described above and illustrated in FIG. 1A. However, in FIG. 2A, only (i) the objective lens assembly 222; (ii) the stage 226A; and (iii) the ATR assembly 230 are shown.

In FIG. 2A, the assembly retainer 236 (e.g. four bolts-but only two are visible in FIG. 2A) selectively and fixedly secures the ATR assembly 230 to the stage 226A. With this design, the ATR assembly 230 can be easily secured to the stage 26A (as an ATR module) when desired to be used and subsequently removed (as an ATR module) when it is desired to use the microscope without the ATR assembly 230.

It should be noted that imaging microscope 212 of FIG. 2A includes a plurality of alternative objective lens assemblies that are mounted to a revolving turret 250. With this design, alternative objective lens assemblies can be used when the ATR assembly 230 is removed.

Figure 2B:
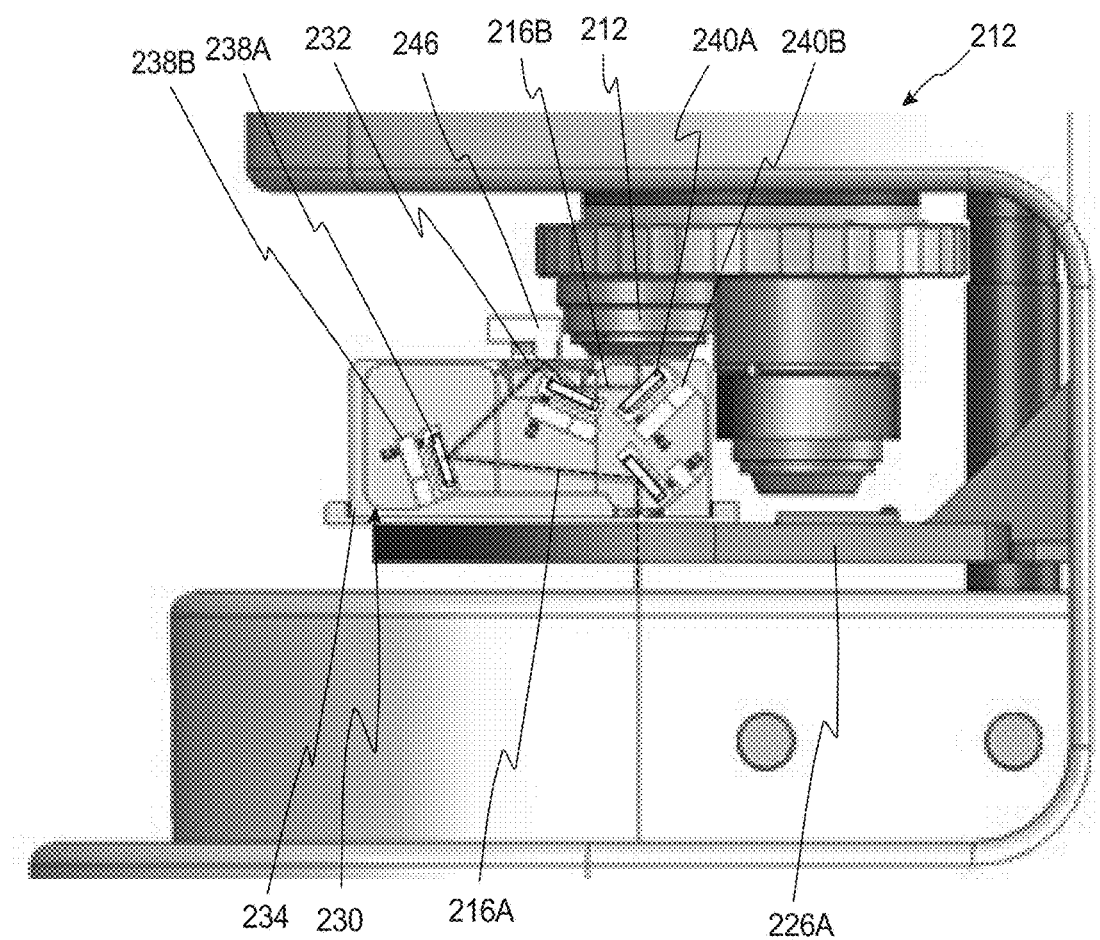
FIG. 2B is side view, in partial cut-away of the portion of the imaging microscope of FIG. 2A.

FIG. 2B is side view, in partial cut-away of the portion of the imaging microscope 212 of FIG. 2A including (i) the objective lens assembly 222; (ii) the stage 226A; and (iii) the ATR assembly 230. Further, in FIG. 2B, the ATR housing 234, the ATR crystal 232, the input routing reflectors 238A, the output routing reflectors 240A, the sample holder 246, a portion of the interrogation beam 216A, and a portion of the reflected beam 216B are illustrated. In this embodiment, each of the input routing reflectors 238A includes an input reflector adjuster 238B (e.g. adjusts with set screws to provide two or more degrees of adjustment) that allows for the precise adjustment of the respective input routing reflector 238A relative to the ATR housing 234 so that the interrogation beam 216A hits the ATR crystal 232 at the correct angle. Similarly, each of the output routing reflectors 240A includes an output reflector adjuster 240B (e.g. adjusts with set screws to provide two or more degrees of adjustment) that allows for the precise adjustment of the respective output routing reflector 240A relative to the ATR housing 234 so that the reflected beam 216B hits the objective lens assembly 222 at the correct angle.

Figure 2C:
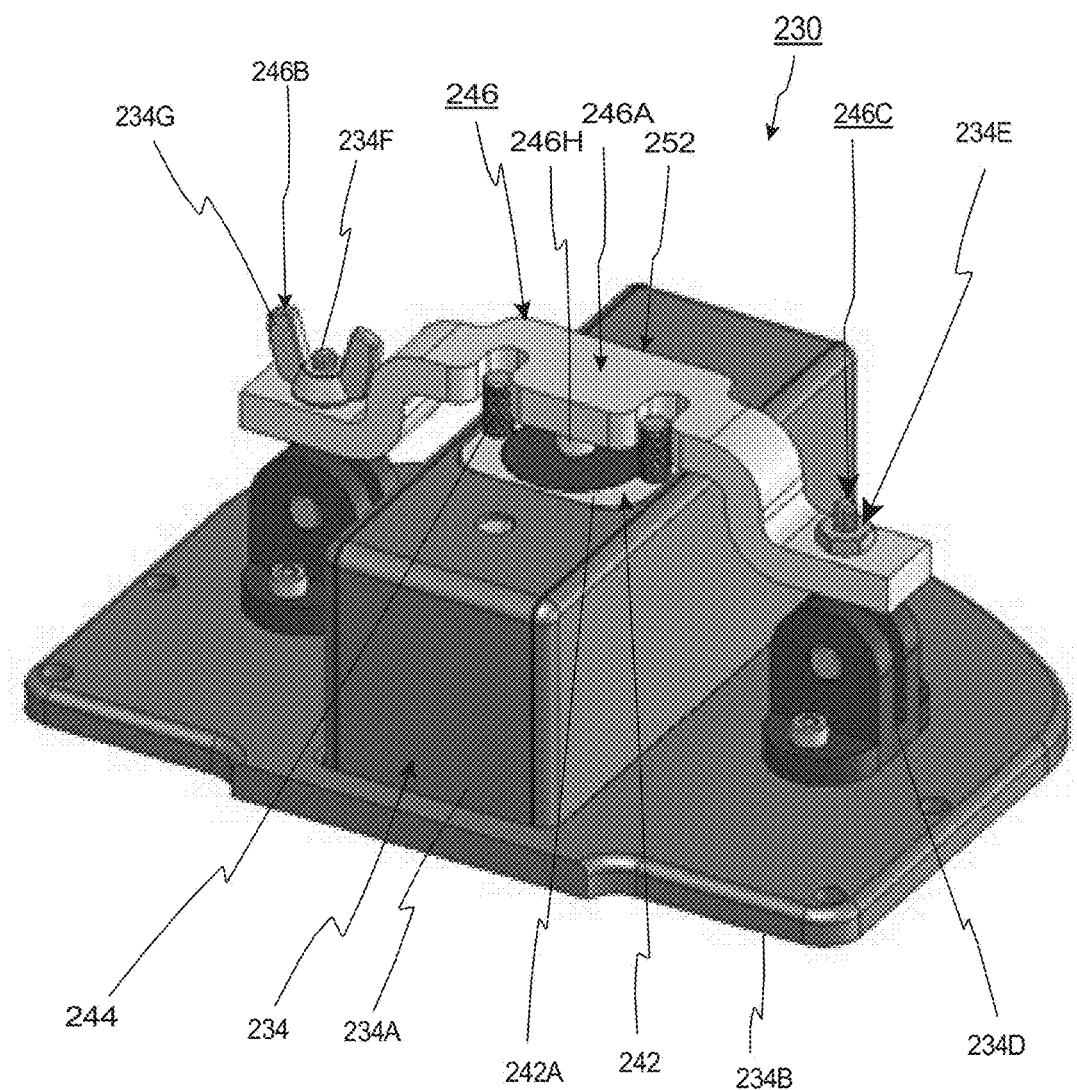
FIGS. 2C and 2D are perspective views of an ATR assembly from FIG. 2A.
Figure 2D:
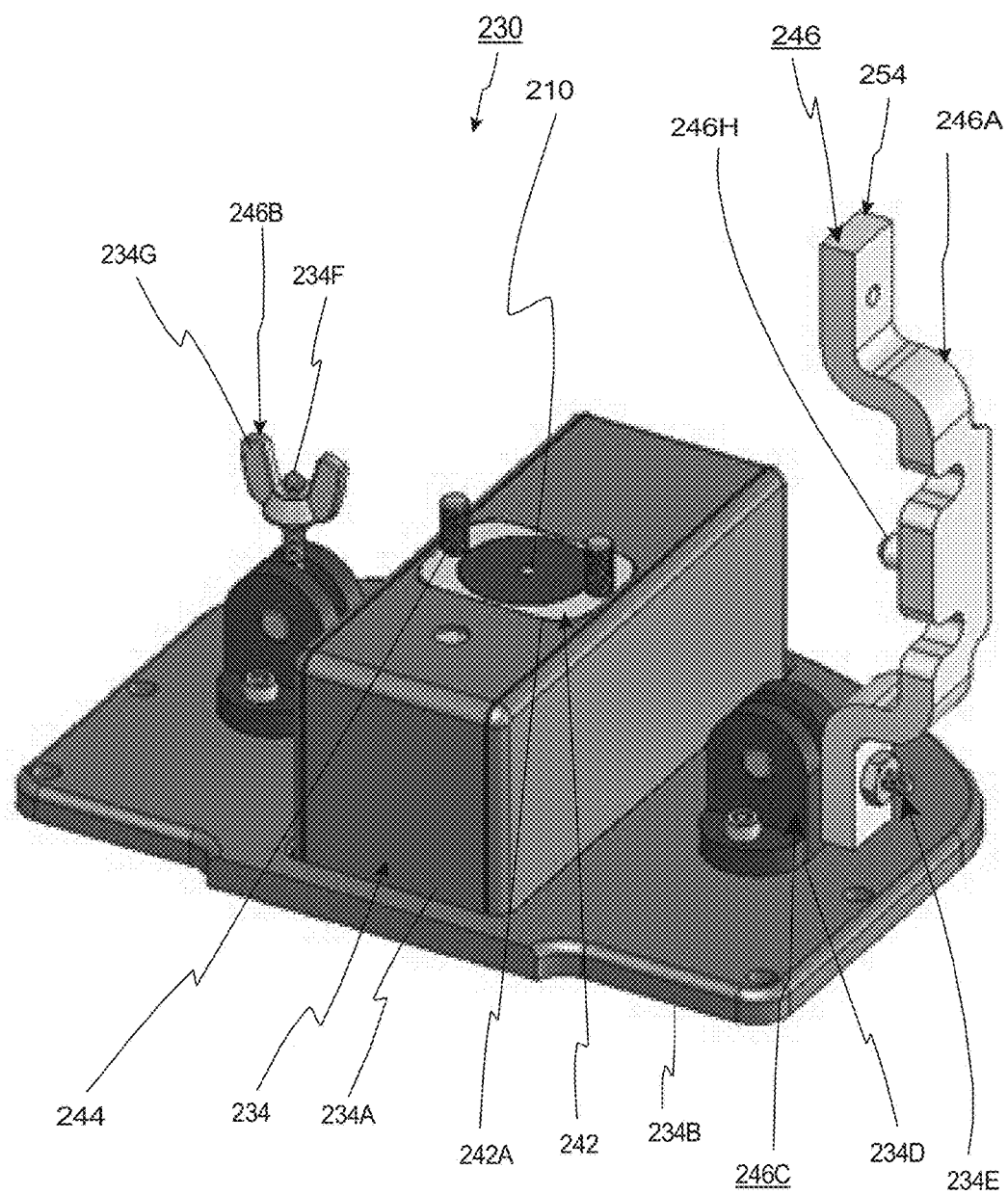

FIGS. 2C and 2D are perspective views of the ATR assembly 230 from FIG. 2A, including (i) an ATR housing 234; (ii) the frame 242A of the crystal housing module 242; (iii) the crystal module retainer 244 that selectively secures the crystal housing module 242; and (iv) the sample holder 246 that provides a distributed, substantially uniform force (applied pressure) across the sample 210.

In FIG. 2C, the sample holder 246 is in a clamped position 252 and in FIG. 2D, the sample holder 246 is in an unclamped position 254. In these embodiments, the sample holder 246 includes (i) an archway shaped crossbar 246A that selectively extends across the top of the housing body 234A and that engages the sample, (ii) a first bar attacher 246B, and a second bar attacher 246C that is spaced apart from the first bar attacher 246B. In this embodiment, the crossbar 246A is rigid, and the bar attachers 246B, 246C selectively secure the crossbar 246A to the housing flange 234B on opposite sides of the housing body 234A.

In one each bar attacher 246A, 246B includes (i) a bottom base 246D that is fixedly secured to the housing flange 234B, and (ii) an attacher fastener 246E that is pivotable secured to the respective housing flange 234B. In this embodiment, each attacher fastener 246E includes (i) a threaded swing bolt 246F that pivotable connected to the bottom base 246D and that extends through one of the ends of the crossbar 246A, and (ii) an fastener nut 246G that is selectively threaded onto the swing bolt 246F. With this design, one or both of the fastener nuts 248G can be selectively rotated and adjusted to apply a controllable, desired uniform pressure to the crossbar 246A, which urges the sample 210 against the ATR crystal and applies a controllable force to the sample 210. Subsequently, one or both of the fastener nuts 248G can be selectively rotated in the opposite direction to remove the crossbar 246A and allow for the removal of the sample and/or the crystal housing module 242. In FIG. 2D, the crossbar 246A has been pivoted with one of the attacher fasteners 246E still attached.

It should be noted that the crossbar 246A can include a flexible tip 246H (pivoting contact) that engages the sample and that distributes force uniformly across the sample.

Figure 2E:
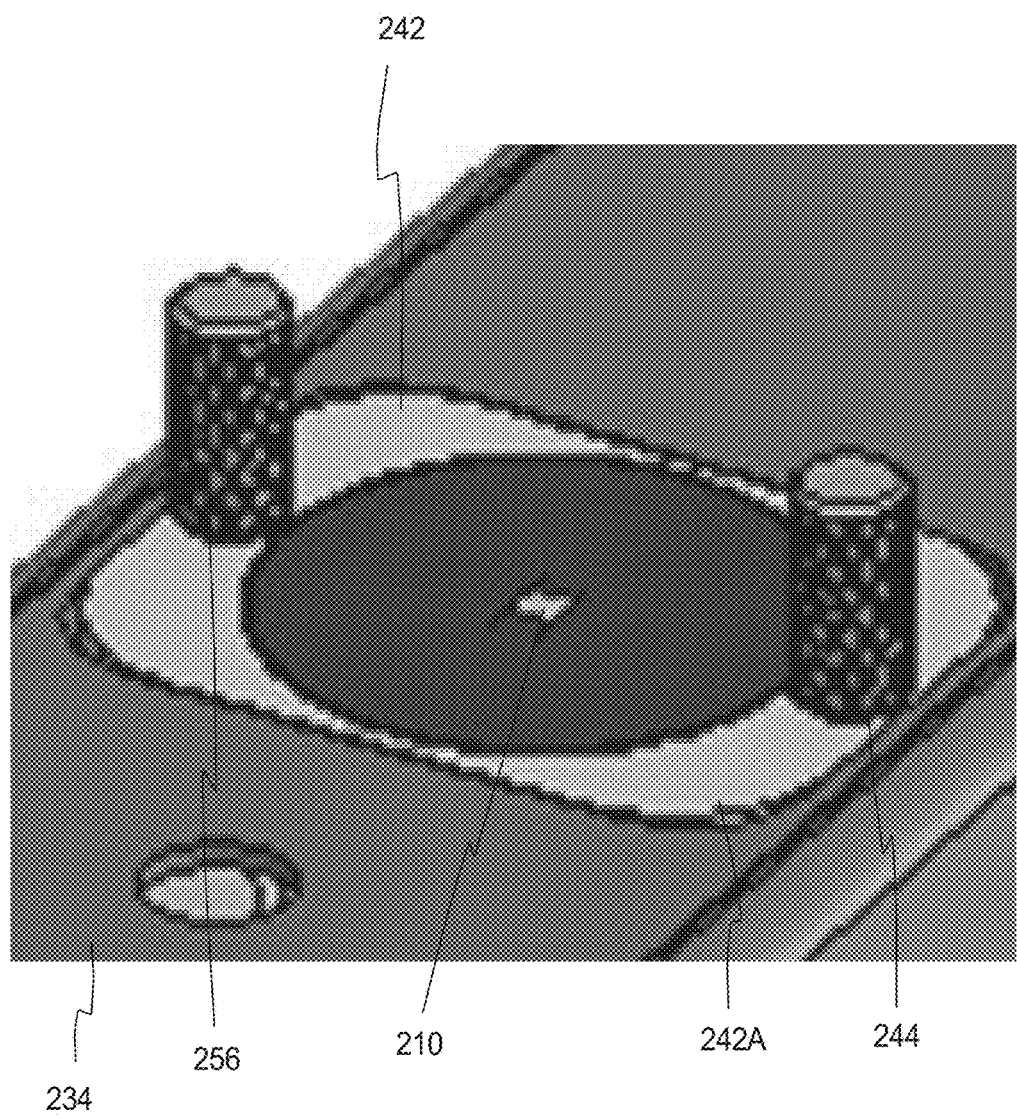
FIG. 2E is an enlarged view of a portion of the ATR assembly.

FIG. 2E is an enlarged view of (i) a portion of the ATR housing 234; (ii) the frame 242A of the crystal housing module 242; (iii) the crystal module retainer 244 that selectively secures the crystal housing module 242; and (iv) the sample 210. In this embodiment, the crystal module retainer 244 includes a pair of fasteners 256 that are selectively threaded into the ATR housing 234.

Figure 3A:
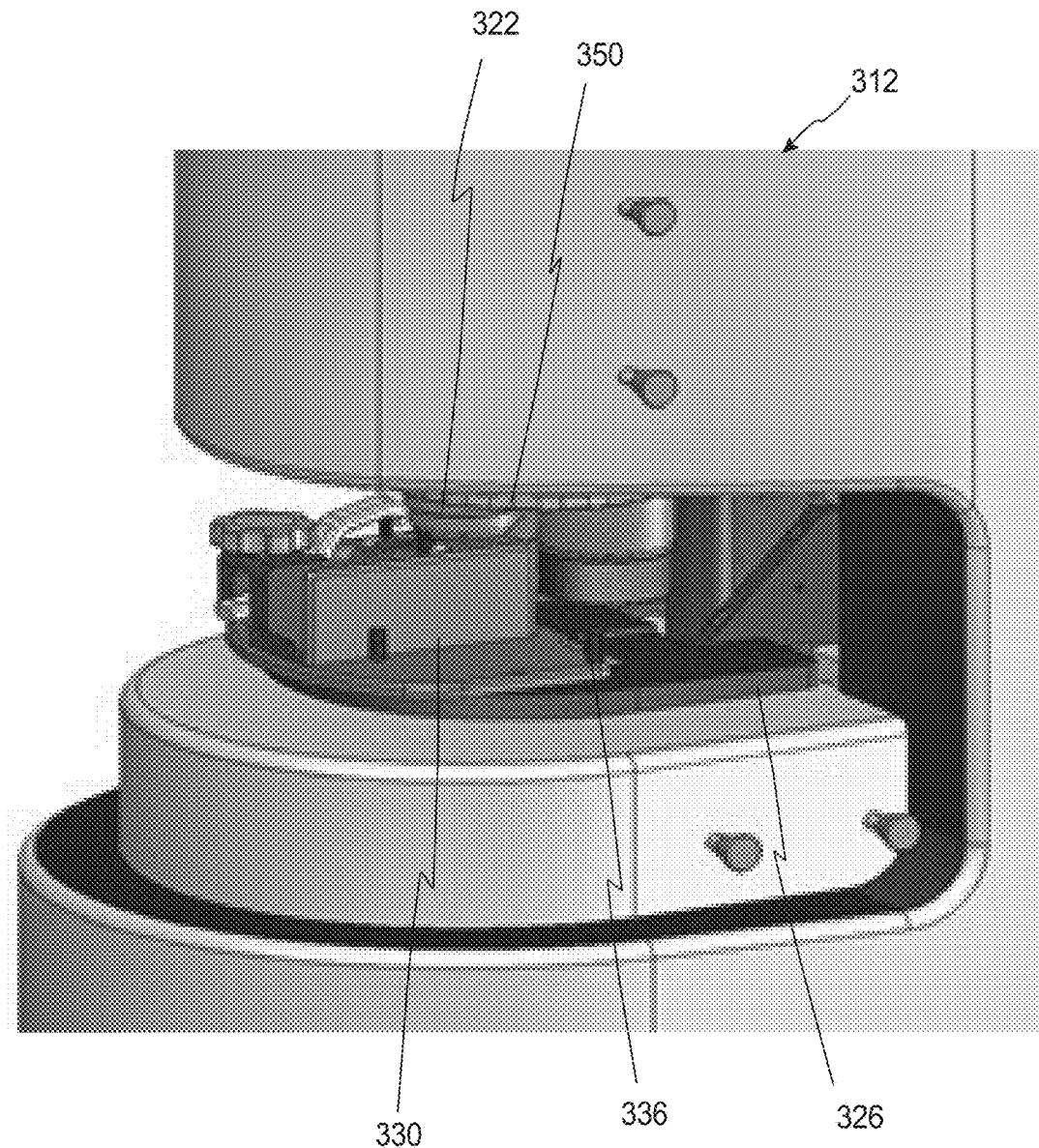
FIG. 3A is partial perspective view of yet another embodiment of an imaging microscope.

FIG. 3A is partial perspective view of yet another embodiment of an imaging microscope 312 that is somewhat similar to the imaging microscope 212 described above and illustrated in FIG. 2A. In FIG. 3A, only (i) the objective lens assembly 322; (ii) the stage 326A; and (iii) the ATR assembly 330 are shown.

In FIG. 3A, the assembly retainer 336 (e.g. four bolts-but only two are visible in FIG. 3A) selectively and fixedly secures the ATR assembly 330 to the stage 326A. With this design, the ATR assembly 330 can be easily secured to the stage 36A as a removable ATR module when desired to be used and subsequently removed (as an ATR module) when it is desired to use the microscope without the ATR assembly 330.

It should be noted that imaging microscope 312 of FIG. 3A again includes a plurality of alternative objective lens assemblies that are mounted to a revolving turret 350. With this design, alternative objective lens assemblies can be used when the ATR assembly 330 is removed.

Figure 3B:
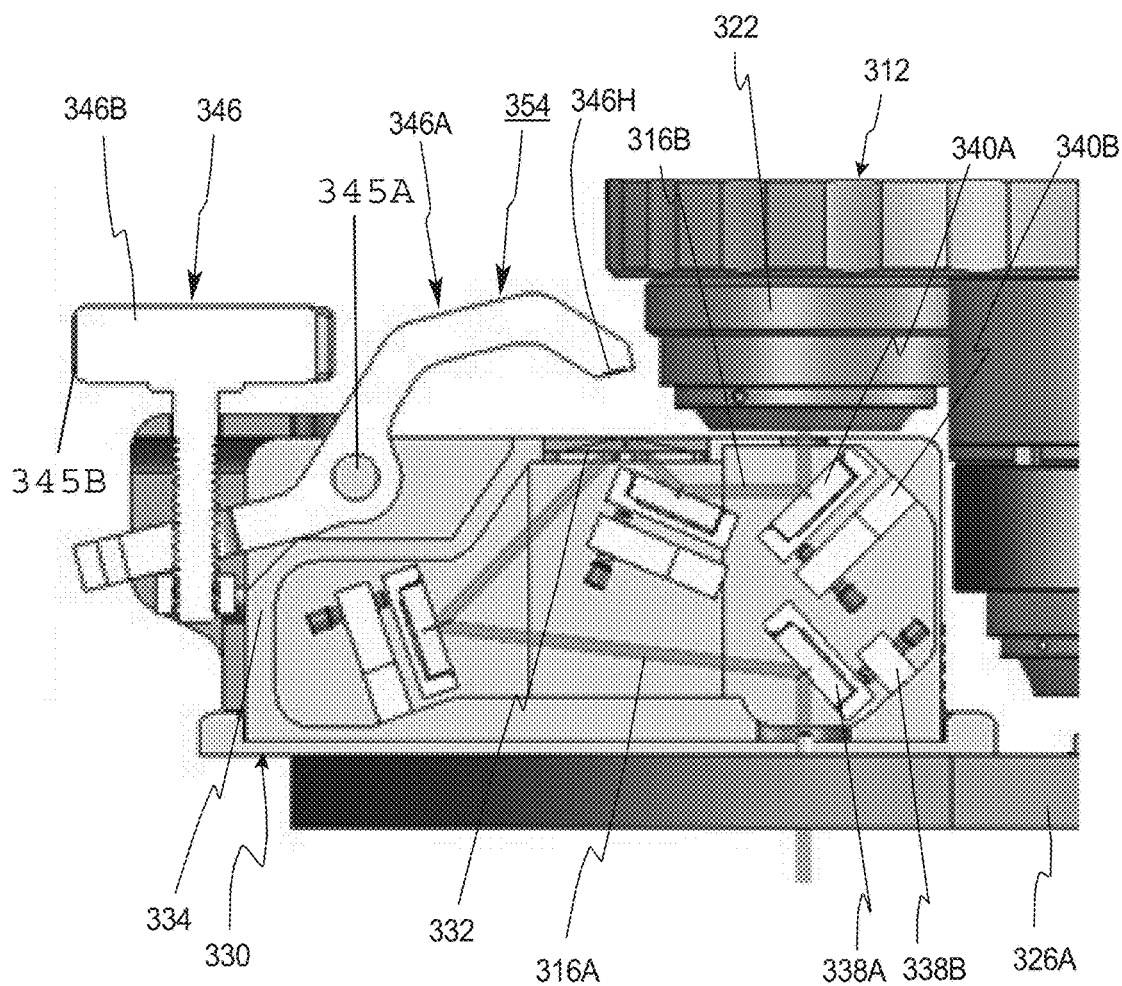
FIG. 3B is side view, in partial cut-away of the portion of the imaging microscope of FIG. 3A.

FIG. 3B is side view, in partial cut-away of the portion of the imaging microscope 312 of FIG. 3A including (i) the objective lens assembly 322; (ii) the stage 326A; and (iii) the ATR assembly 330. Further, in FIG. 3B, the ATR housing 334, the ATR crystal 332, the input routing reflectors 338A, the output routing reflectors 340A, the sample holder 346 in the unclamped position 354, a portion of the interrogation beam 316A, and a portion of the reflected beam 316B are illustrated. In this embodiment, each of the input routing reflectors 338A includes an input reflector adjuster 338B (e.g. adjusts with set screws to provide two degrees of adjustment) that allows for the precise adjustment of the respective input routing reflector 338A relative to the ATR housing 334 so that the interrogation beam 316A hits the ATR crystal 332 at the correct angle. Similarly, each of the output routing reflectors 340A includes an output reflector adjuster 340B (e.g. adjusts with set screws to provide two degrees of adjustment) that allows for the precise adjustment of the respective output routing reflector 340A relative to the ATR housing 334 so that the reflected beam 316B hits the objective lens assembly 322 at the correct angle. Once the routing reflectors 338A, 340A are properly aligned, the entire ATR assembly 330 can be installed as a module to the microscope.

It should be noted that the design of the sample holder 346 is different than the embodiments described above. More specifically, in this embodiment, the sample holder 346 includes (i) a clamping arm 346A that is pivotable connected via a pivot 345A to the ATR housing 334; and (ii) a manually operated, threaded adjuster 346B. In this embodiment, rotation of the threaded adjuster 346B in a first rotational direction causes the clamping arm 346A to rotate (in the clockwise direction in FIG. 3B) so that a distal tip 346H of the clamping arm 346A moves towards and subsequently engages the sample to urge the sample against the ATR crystal 332. Similarly, rotation of the threaded adjuster 346B in a second rotational direction causes the clamping arm 346A to rotate (in the counter-clockwise direction in FIG. 3B) so that the distal tip 346H of the clamping arm 346A moves away from the sample. With this design, the threaded adjuster 346B can be selectively controlled to apply the desired and uniformly distributed force to the sample so that the sample makes the desired contact with the ATR crystal.

In one embodiment, the threaded adjuster 346B includes a torque limiting knob 345B that will limit the clamping force and make it obvious to the user when the required clamping force has been reached. For example the torque limiting knob can limit the torque by slipping (as in a friction plate slip-clutch) when the desired torque is reached.

It should be noted that in this embodiment, the sample holder 346 is an off-axis clamping mechanism that urges the sample against the ATR crystal 332. With this design, the sample holder 346 provides more space for access to the sides of the ATR assembly 330. In one embodiment, the axis of the threaded adjuster 346B is offset and spaced apart from the cantilevering distal tip 346H that engages the sample.

It should also be noted that the distal tip 346H can be designed to create a pivoting contact that distributes force uniformly across the sample.

Figure 3C:
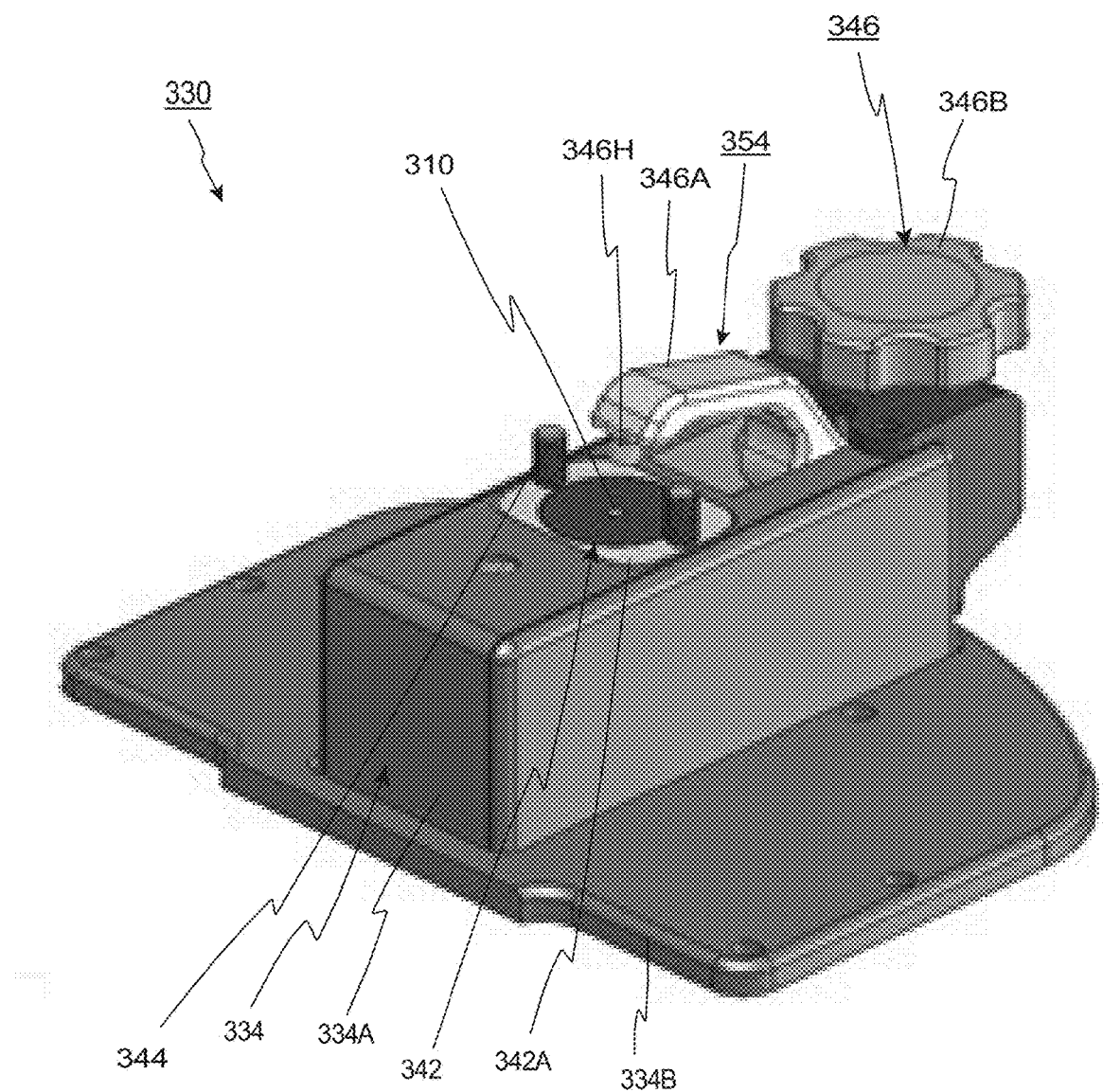
FIG. 3C is a perspective view of the ATR assembly from FIG. 3A.

FIG. 3C is a perspective view of the ATR assembly 330 from FIG. 3A, including (i) an ATR housing 334; (ii) the frame 342A of the crystal housing module 342; (iii) the crystal module retainer 344 that selectively secures the crystal housing module 342; and (iv) the sample holder 346 that provides a distributed, substantially uniform force (applied pressure) across the sample 310.

In FIG. 3C, the sample holder 346 is in the unclamped position 354. In this embodiment, the sample holder 346 includes (i) the clamping arm 346A that is pivotable connected to the ATR housing 334; and (ii) the manually operated, threaded adjuster 346B. The distal tip 346 is also illustrated.

Figure 3D:
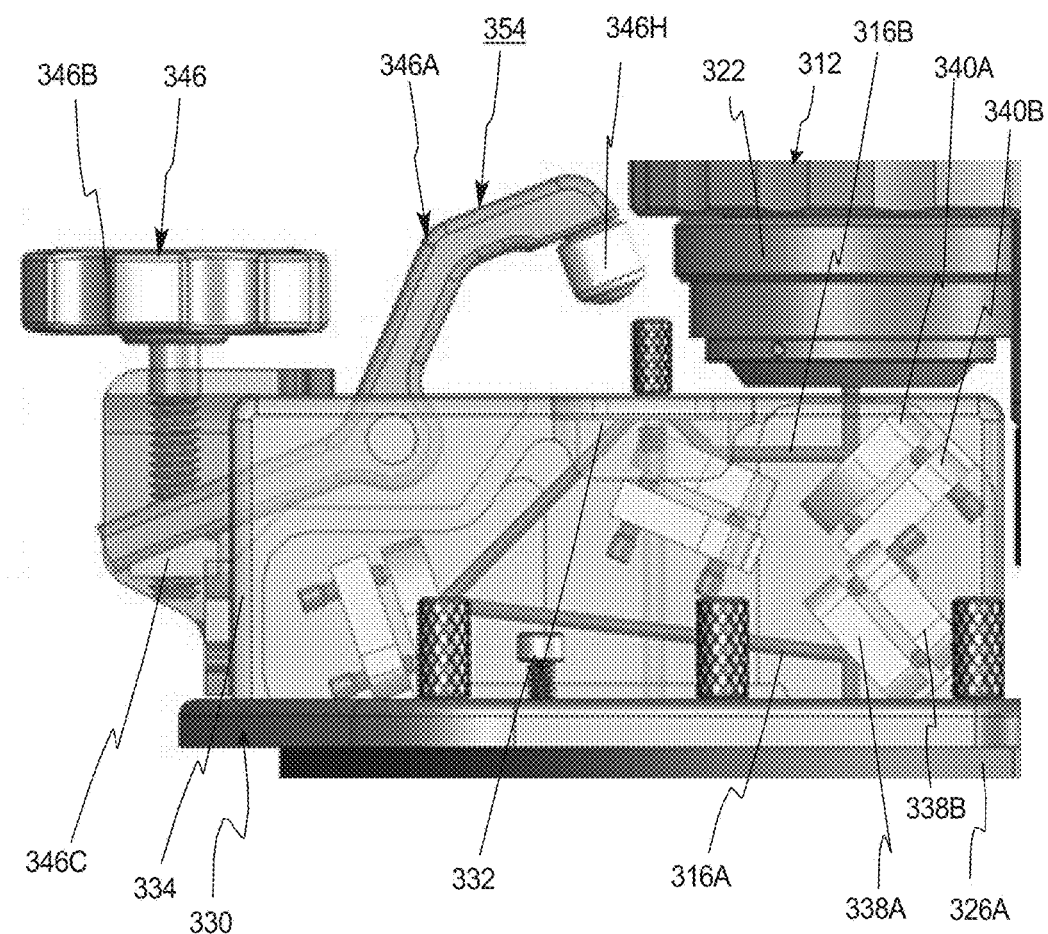
FIG. 3D is side view, which illustrates some normally obstructed components, of a portion of the imaging microscope of FIG. 3A.

FIG. 3D is side view, which illustrates some normally obstructed components, of a portion of the imaging microscope 312 of FIG. 3A including (i) the objective lens assembly 322; (ii) the stage 326A; and (iii) the ATR assembly 330. Further, in FIG. 3D, the ATR housing 334, the ATR crystal 332, the input routing reflectors 338A, the input reflector adjusters 338B, the output routing reflectors 340A, the output reflector adjusters 340B, the sample holder 346 in the unclamped position 354, a portion of the interrogation beam 316A, and a portion of the reflected beam 316B are illustrated.

FIG. 3D also illustrates the sample holder 346 in a slightly different fashion. More specifically, FIG. 3D again illustrates (i) the clamping arm 346A that is pivotable connected to the ATR housing 334; and (ii) the manually operated, threaded adjuster 346B. However, as illustrated in FIG. 3D, the sample holder 346 also includes an internally threaded nut 346C that is attached to and slide relative to the clamping arm 346A. With this design, the threaded adjuster 346B can be rotated relative to the ATR housing 334 without moving up and down. Further, rotation of the threaded adjuster 346B in a first rotational direction causes the nut 346 to move upward and the clamping arm 346A to rotate (in the clockwise direction in FIG. 3D) so that a distal tip 346H of the clamping arm 346A moves towards and subsequently engages the sample to urge the sample against the ATR crystal 332. Similarly, rotation of the threaded adjuster 346B in a second rotational direction causes the nut 346C to move downward and the clamping arm 346A to rotate (in the counter-clockwise direction in FIG. 3D) so that the distal tip 346H of the clamping arm 346A moves away from the sample.

Figure 3E:
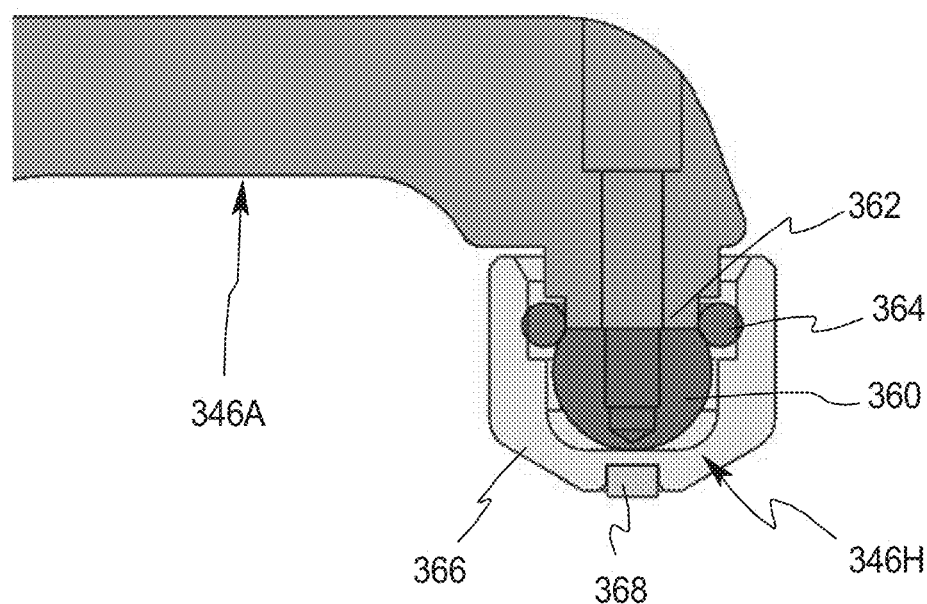
FIG. 3E is a side view and FIGS. 3F and 3G are alternative perspective views of one non-exclusive embodiment of a distal tip.
Figure 3F:
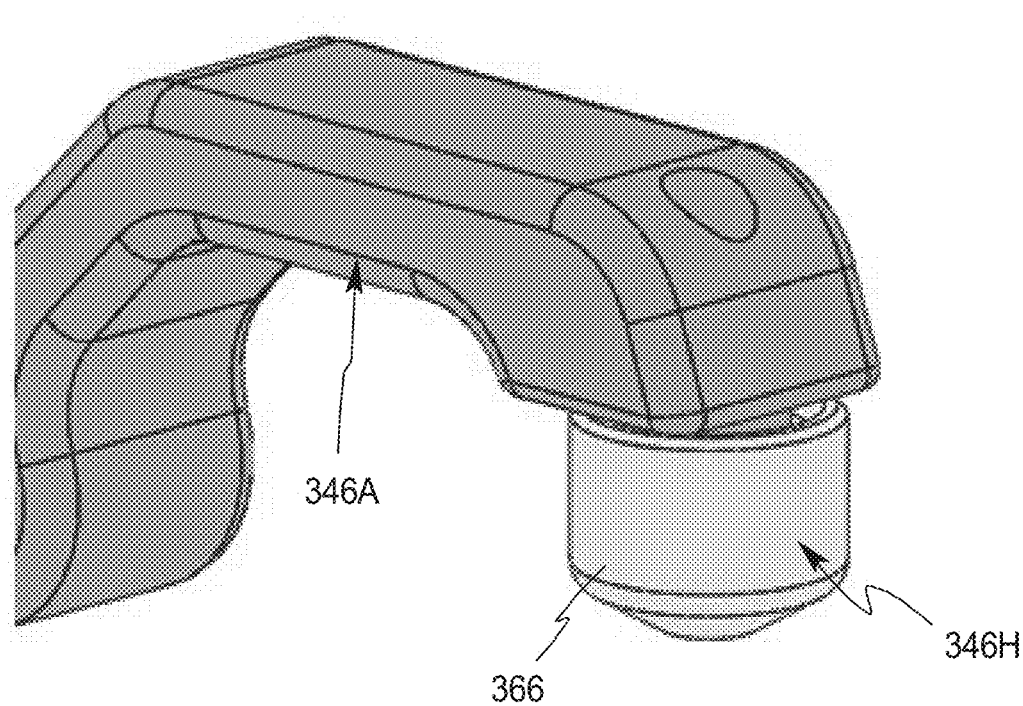
Figure 3G:
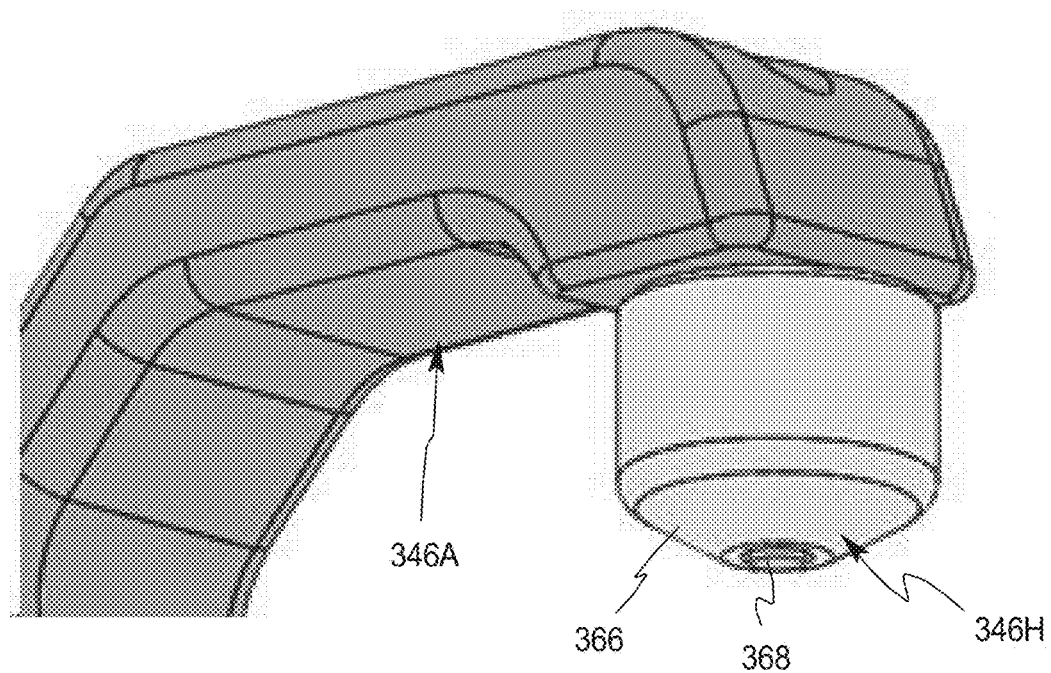

FIG. 3E is a side view and FIGS. 3F and 3G are alternative perspective views of one non-exclusive embodiment of the distal tip 346H of the clamping arm 346A. In this embodiment, the distal tip 346H is designed to create a pivoting contact that distributes force uniformly across the sample.

In one, non-exclusive embodiment, the distal tip 346H is a ball-and-socket type design that includes (i) a steel ball 360 (e.g. having a five millimeter diameter) that is fixedly secured to a distal end 362 of the clamping arm 346A, (ii) an "O" ring 364 that encircles the intersection of the distal end 362 and the ball 360, and (iii) a pivoting cap 366 that fits over the ball 360, the "O" ring 364 and the distal end 362. With this design, the pivoting cap 366 is free to pivot as necessary relative to the ball 360, the "O" ring 364 and the distal end 362 to equally distribute the forces on the sample. In this embodiment, the cap 366 is kept in place with the "O" ring 364. Additionally, the pivoting cap 366 can include a low friction, engagement pad 368 that engages the sample while allowing for some sliding as the cap 366 pivots.

In one embodiment, in order to improve accuracy, multiple images can be captured while the interrogation beam is modulated and these multiple images are averaged. For example, images can be captured at −0.5, 0, and +0.5 about a target wavelength and the three images can be averaged. Alternatively, a single image can be captured while the interrogation beam is modulated about a target wavelength. For example, an image can be captured while the illumination beam is modulated plus or minus 0.5 wavelengths about a target wavelength. In these examples, the interrogation beam is nominally monochromatic and has an interrogation wavelength that is a range that is centered on the target wavelength.

Figure 4A:
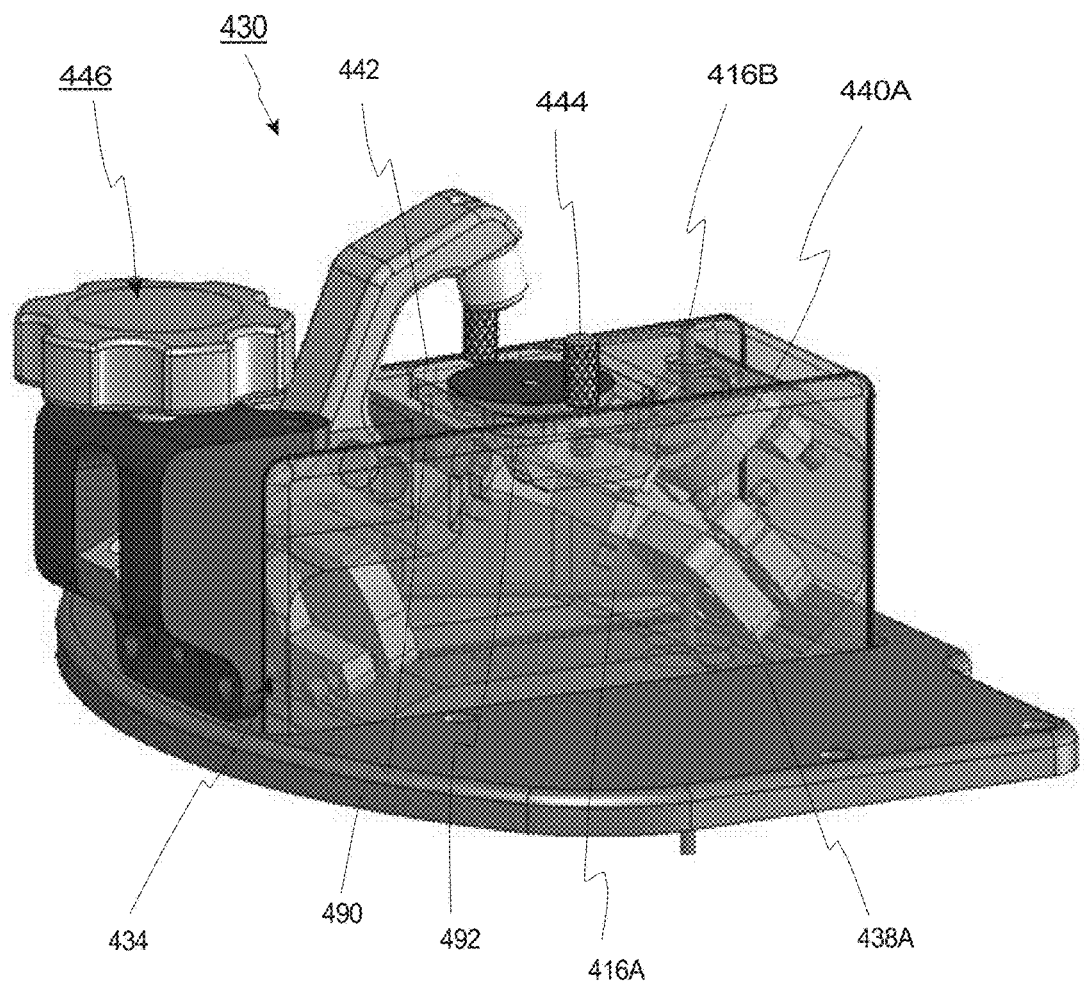
FIG. 4A is a perspective view of another embodiment of an ATR assembly.
Figure 4B:
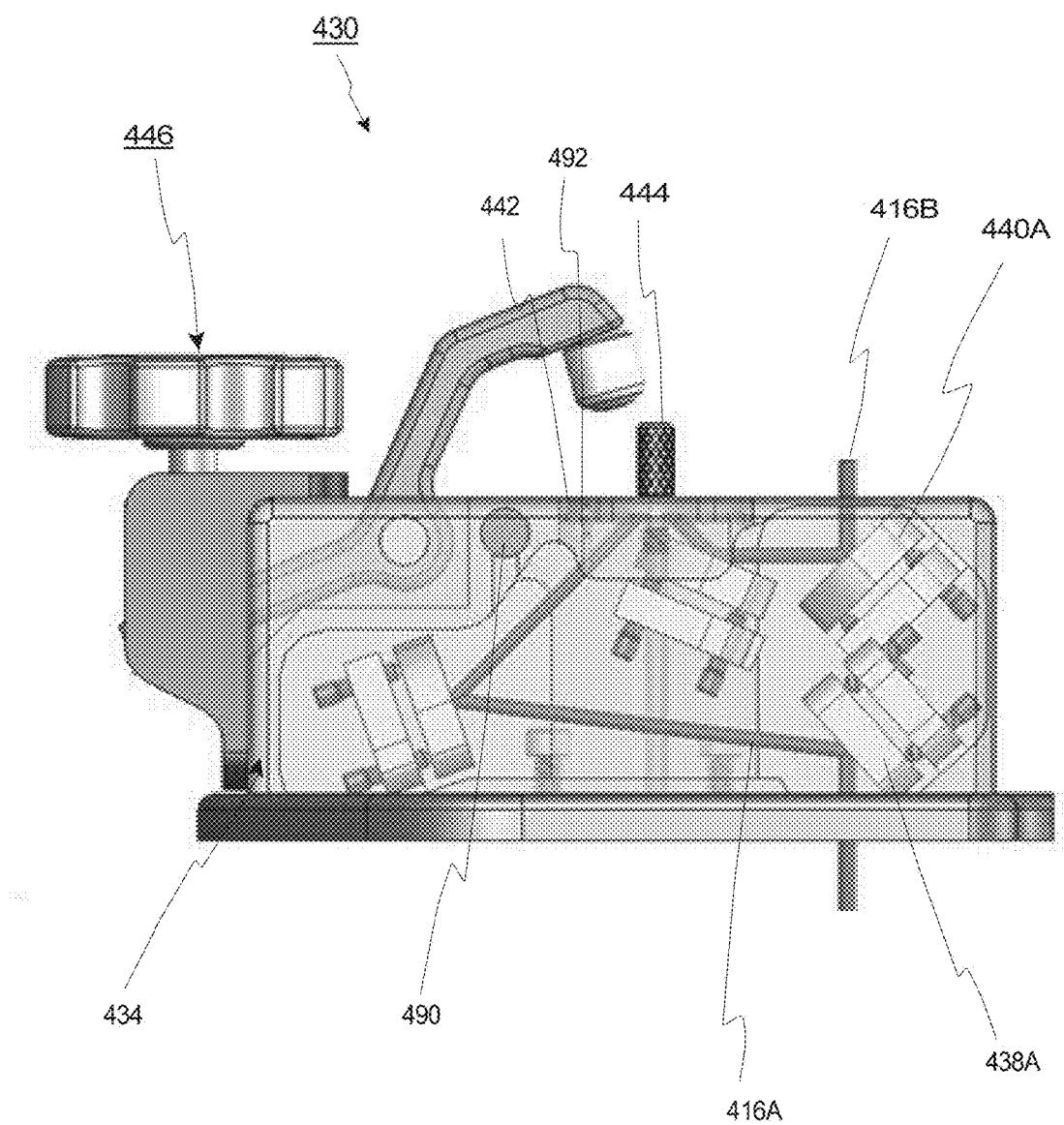
FIG. 4B is a side view of the ATR assembly of FIG. 4A.

FIG. 4A is a perspective view and FIG. 4B is a side view of another embodiment of an ATR assembly 430 that includes (i) an ATR housing 434; (ii) the crystal housing module 442; (iii) the crystal module retainer 444 that selectively secures the crystal housing module 442; (iv) the ATR crystal 432; (v) the input routing reflectors 438A; (vii) the output routing reflectors 440A; (viii) the sample holder 446 in the unclamped position; (ix) a portion of the interrogation beam 416A; and (x) a portion of the reflected beam 416B that are somewhat similar to the corresponding components described above.

However, in this embodiment, the ATR assembly 430 includes a temperature controller 490 and a temperature sensor 492 that are positioned near the ATR crystal 432 in the ATR housing 434. For example, the temperature controller 490 can include an embedded heater and/or a chiller and the temperature sensor 492 can be a thermistor or thermal couple. With this design, the temperature sensor 492 that can be actively monitor the temperature of the ATR crystal 432 and the temperature controller 490 can be actively controlled by the control system (illustrated in FIG. 1A) with feedback from the temperature sensor 492 to maintain a desired temperature of the ATR crystal 432.

Figure 4C:
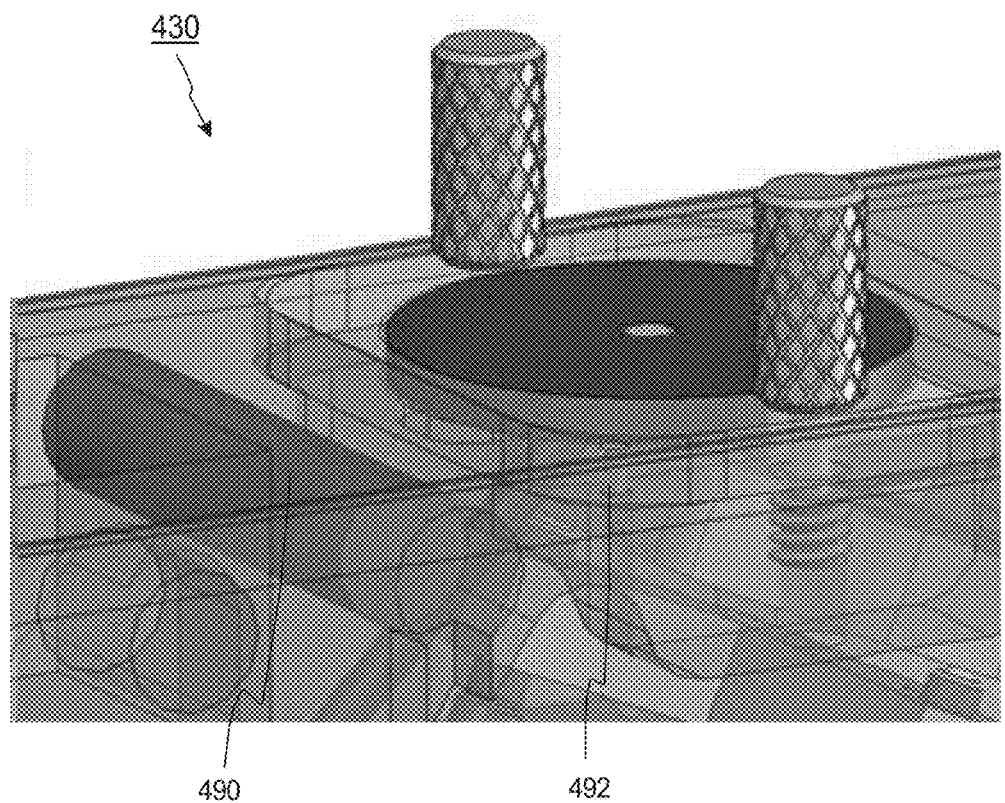
FIG. 4C is an enlarged view of a portion of the ATR assembly of FIG. 4A.

FIG. 4C, is an enlarged view of a portion of the ATR assembly 430 of FIGS. 4A and 4B illustrating the temperature controller 490 and the internal temperature sensor 492.

Figure 4D:
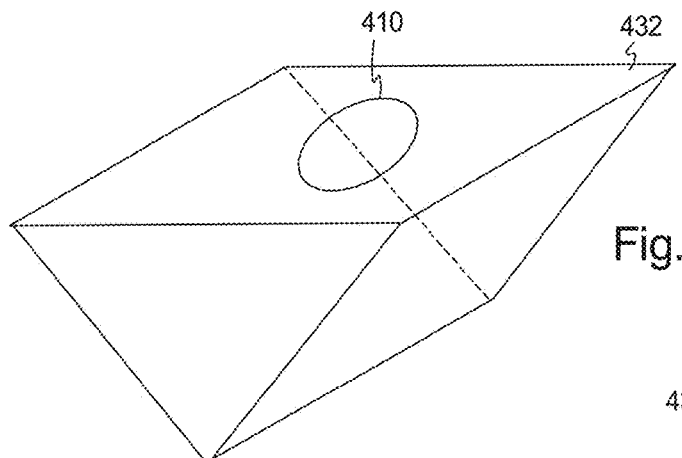
FIG. 4D is a perspective view of an ATR crystal.
Figure 4E:
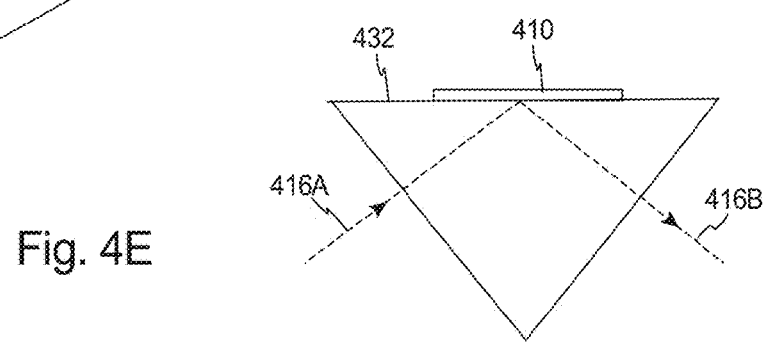
FIG. 4E is an end view of the ATR crystal of FIG. 4D.

FIG. 4D is a perspective view and FIG. 4E is an end view of one non-exclusive example of an ATR crystal 432 and the sample 410. In this example, the ATR crystal has a triangular shaped cross-section. Further, FIG. 4E illustrates the interrogation beam 416A entering and the reflected beam 416B exiting the ATR crystal 432.

Figure 5A:
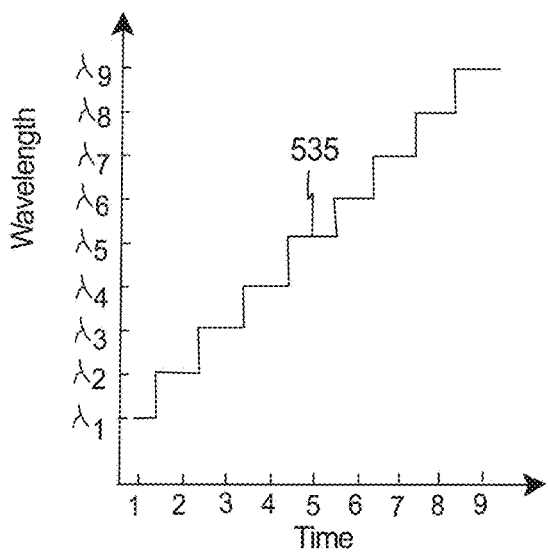
FIG. 5A is a graphical illustration of wavelength versus time during the generation of a set of preliminary images.
Figure 5B:
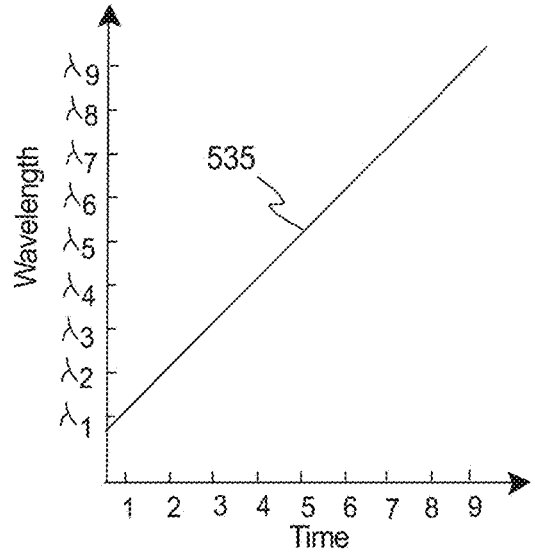
FIG. 5B is another graphical illustration of wavelength versus time during the generation of a set of preliminary images.

FIG. 5A is a graphical illustration of wavelength versus time during the generation of such a plurality of preliminary images. As provided herein, the control system 28 (illustrated in FIG. 1A) can control the MIR laser source 14 (illustrated in FIG. 1A) to generate an interrogation beam 16A (illustrated in FIG. 1A) having a center wavelength that changes in a stepped pattern from a first wavelength to a ninth wavelength over time. Somewhat similarly, FIG. 5B is another graphical illustration of wavelength versus time during the generation of such a plurality of preliminary images. In this example, the control system 28 (illustrated in FIG. 1A) controls the MIR laser source 14 (illustrated in FIG. 1A) to generate an interrogation beam 16A (illustrated in FIG. 1A) having a center wavelength that changes in a continuous fashion from a first wavelength to a ninth wavelength over time. For example, the continuous fashion can be linear. It should be noted that the wavelength can be adjusted in another fashion than illustrated in FIGS. 5A and 5B.

Additionally, it should be appreciated that the number of individual wavelengths and the spacing between the individual wavelengths utilized in generating the preliminary images can be varied. For example, in certain non-exclusive alternative embodiments, the number of individual wavelengths of the interrogation beam 16A can vary over time one, two, three, four, five, six, or more individual wavelengths both above and below the interrogation wavelength. Additionally, in certain non-exclusive alternative embodiments, the spacing between the individual wavelengths within the interrogation beam 16A can be approximately 0.1, 0.2, 0.25, 0.33, 0.5, 0.67, 0.7, 1.0, 2.0 or 4.0 wavenumbers. It should be appreciated that the number of individual wavelengths and the spacing between the wavelengths within each interrogation beam 16A can be different than the specific examples listed above.

In the examples shown in FIGS. 5A and 5B, the first through ninth wavelengths make up the interrogation wavelength for this interrogation beam 16A. In this simplified example, (i) at time labeled one, the interrogation beam 16A has a first center wavelength; (ii) at time labeled two, the interrogation beam 16A has a second center wavelength; (iii) at time labeled three, the interrogation beam 16A has a third center wavelength; (iv) at time labeled four, the interrogation beam 16A has a fourth center wavelength; (v) at time labeled five, the interrogation beam 16A has a fifth center wavelength; (vi) at time labeled six, the interrogation beam 16A has a sixth center wavelength; (vii) at time labeled seven, the interrogation beam 16A has a seventh center wavelength; (viii) at time labeled eight, the interrogation beam 16A has an eighth center wavelength; and (ix) at time labeled nine, the interrogation beam 16A has a ninth center wavelength.

Additionally, in the examples illustrated in FIGS. 5A and 5B, the center-most, i.e. fifth, wavelength represents a target wavelength 535 that is at the approximate center of the interrogation wavelength. In this example, the interrogation wavelength is a distribution of wavelengths centered around the target wavelength 535.

Figure 5C:
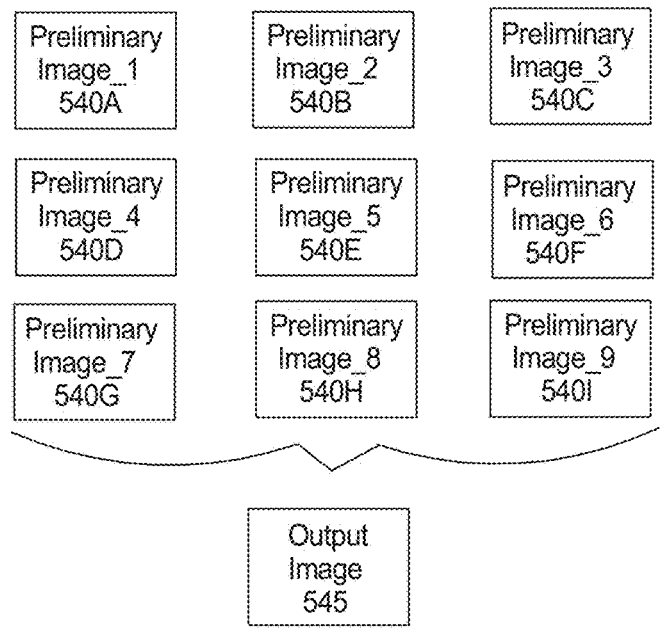
FIG. 5C illustrates a plurality of preliminary images used to generate an output image at an interrogation wavelength.

FIG. 5C illustrates a plurality of preliminary images 540A, 540B, 540C, 540D, 540E, 540F, 540G, 540H, 540I that can be used to generate an output image 545 for this interrogation beam.

In this simplified example, with reference to FIGS. 5A-5C, the imaging microscope 12 (illustrated in FIG. 1A) is controlled to (i) capture a first preliminary ("sampling") image 540A while illuminating the sample 10 (illustrated in FIG. 1A) with light at the first center wavelength (at time labeled 1); (ii) capture a second preliminary image 540B while illuminating the sample 10 with light at the second center wavelength (at time labeled 2); (iii) capture a third preliminary image 540C while illuminating the sample 10 with light at the third center wavelength (at time labeled 3); (iv) capture a fourth preliminary image 540D while illuminating the sample 10 with light at the fourth center wavelength (at time labeled 4); (v) capture a fifth preliminary image 540E while illuminating the sample 10 with light at the fifth center wavelength (at time labeled 5); (vi) capture a sixth preliminary image 540F while illuminating the sample 10 with light at the sixth center wavelength (at time labeled 6); (vii) capture a seventh preliminary image 540G while illuminating the sample 10 with light at the seventh center wavelength (at time labeled 7); (viii) capture an eighth preliminary image 540H while illuminating the sample 10 with light at the eighth center wavelength (at time labeled 8); and (ix) capture a ninth preliminary image 540I while illuminating the sample 10 with light at the ninth center wavelength (at time labeled 9).

Subsequently, the control system 28 uses one or more of the preliminary ("sampling") images 540A-540I to generate the output image 545 for this interrogation wavelength. The number of preliminary images 540A-540I used to generate the output image 545 can vary. More particularly, the number of preliminary images 540A-540I is based on the number of individual wavelengths within the interrogation beam 16A selected both above and below the interrogation wavelength.

Various alternative suitable methods can be utilized to combine the plurality of images, i.e. the preliminary images, generated at each of the individual wavelengths within the interrogation beam 16A to ultimately capture the desired output image 545 for the interrogation wavelength. For example, certain suitable methods are as illustrated and described in PCT Application Serial No. PCT/US15/11884, which, as noted above, is incorporated herein by reference.

In one non-exclusive embodiment, the preliminary images 540A-540I can be passed through a low-pass filter to generate the desired output image 545 for the specific interrogation wavelength. Stated in another manner, a low-pass filter is subsequently applied to the spectral response of each pixel in the respective preliminary images to create an output spectral image at a lower spectral resolution with less noise. As non-exclusive examples, the low-pass filter can utilize either a running average or Gaussian filter, which can be optionally followed by sub-sampling through decimation. One such method is to perform a simple average of the collected data points. Another method is to perform a simple average of the data points after extreme values are removed from the data set. Extreme values may be defined, for example, as those falling outside of a predefined multiple of the root-mean-square of the collection. Another method is to apply a low-pass filter over the data set, such as a Chebyshev filter. Yet another filtering method includes Fast Fourier Transform.

In this example, the influence of parasitic etalon components can be reduced and managed by discrete sampling, filtering, and decimation. First, a plurality of preliminary images 540A-540I are captured. Subsequently, the preliminary images 540A-540I are filtered to create a lower spectral resolution image that can optionally be sub-sampled (e.g., via decimation) to remove the redundant information from now being oversampled. Thus, a collection of spectral images is captured at multiple wavelengths in the neighborhood of the target wavelength. The collection of data points is then mathematically filtered so as to produce a single higher-fidelity data point for this interrogation wavelength.

In another embodiment, a reduction in spurious spectral artifacts in the output image can be achieved through fast source wavelength modulation and real-time detector averaging. Stated in another fashion, a reduction in noise can be achieved by rapidly tuning the light source 14 to generate an interrogation beam 16A having a rapidly varying center wavelength, and slowly capturing the output image with the image sensor 24A during the wavelength variation. With this design, for each interrogation wavelength, the imaging microscope 12, i.e. the control system 28 (illustrated in FIG. 1A) can dither the wavelength of the interrogation beam 16A during the capture of the respective output image.

Figure 6A:
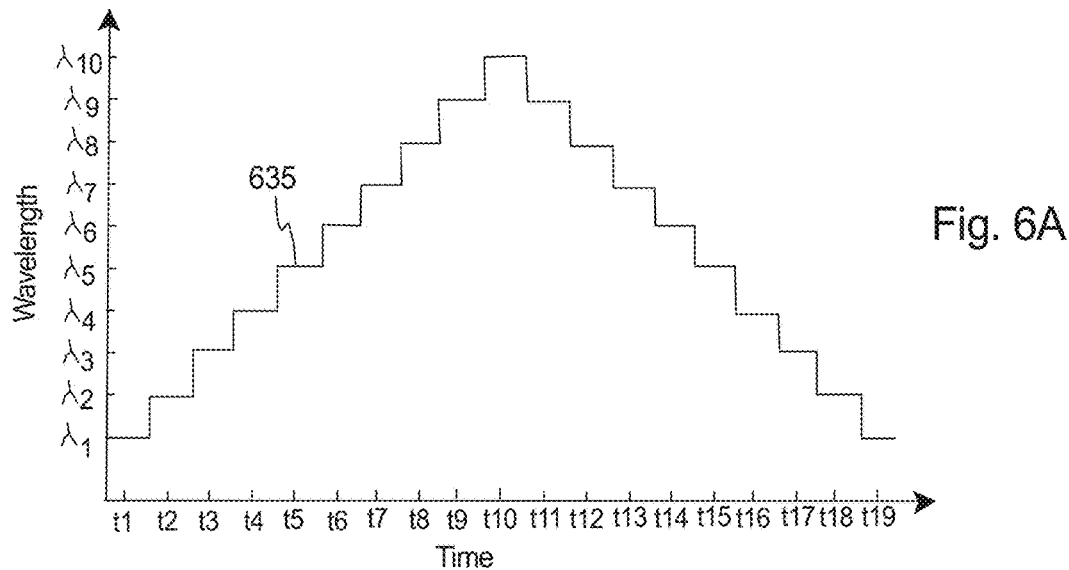
FIG. 6A is a graphical illustration of wavelength versus time during the generation of an output image.
Figure 6B:
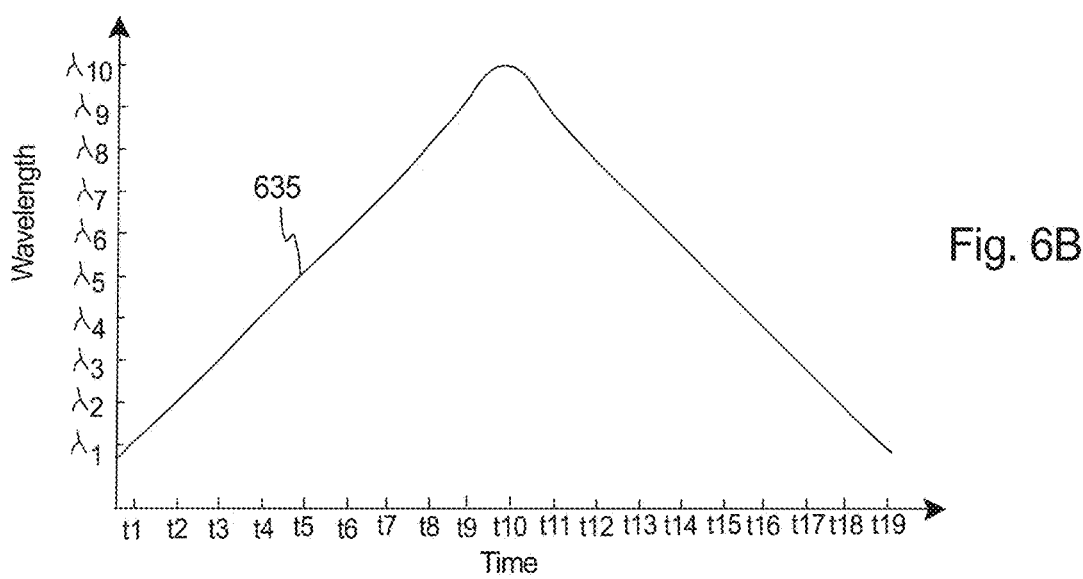
FIG. 6B is another graphical illustration of wavelength versus time during the generation of an output image.
Figure 6C:
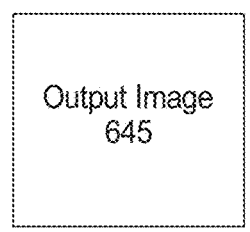
FIG. 6C illustrates an output image at an interrogation wavelength.

For example, FIG. 6A is a graphical illustration of wavelength versus time during the generation and/or capture of an output image 645 (illustrated in FIG. 6C). As provided herein, the control system 28 (illustrated in FIG. 1A) can control the MIR laser source 14 (illustrated in FIG. 1A) to generate an interrogation beam 16A (illustrated in FIG. 1A) having a center wavelength that changes in a stepped pattern from a first wavelength to a tenth wavelength and back to the first wavelength over time. Somewhat similarly, FIG. 6B is another graphical illustration of wavelength versus time during the generation and/or capture of an output image 645 (illustrated in FIG. 6C). In this example, the control system 28 (illustrated in FIG. 1A) controls the MIR laser source 14 (illustrated in FIG. 1A) to generate an interrogation beam 16A (illustrated in FIG. 1A) having a center wavelength that changes in a continuous fashion from the first wavelength to the tenth wavelength and back to the first wavelength over time. For example, the continuous fashion can be linear. It should be noted that the wavelength can be adjusted in another fashion than illustrated in FIGS. 6A and 6B.

In the examples illustrated in FIGS. 6A and 6B, the center-most, i.e. the fifth wavelength represents a target wavelength 635 that is at the approximate center of the interrogation wavelength. In this example, the interrogation wavelength is a distribution of wavelengths centered around the target wavelength 635.

FIG. 6C illustrates an output image 645 that is captured while the interrogation beam 16A (illustrated in FIG. 1A) is cycled from the first through tenth wavelength (first cycle) and back from the tenth wavelength to the first wavelength (second cycle). In this simplified example, with reference to FIGS. 6A-6C, the imaging microscope 12 (illustrated in FIG. 1A) is controlled to capture the output image 645 for the interrogation wavelength 635 (illustrated, for example, in FIGS. 6A and 6B) while the center wavelength of the interrogation beam 16A is varied (dithered) cycled twice between one and ten wavelengths.

Additionally, it should be appreciated that the range and amount (number of cycles) of dithering about the target wavelength 635 can be varied as desired. For example, in certain non-exclusive alternative embodiments, the dithering of the wavelengths about the target wavelength during the capture time can be approximately plus or minus 0.1, 0.25, 0.33, 0.5, 1.0, 2.0, 3.0, 4.0, 5.0, 6.0, 7.0 or 10.0 wavenumbers. It should be noted that the wavenumber examples are non-exclusive, and/or that the wavenumbers can be easily converted to wavelengths. Additionally, in some non-exclusive alternative embodiments, the wavelengths about the target wavelength can be dithered through approximately one, two, three, four, five, ten, twenty, forty, fifty or one hundred cycles during the capture time of the output image 645 by the image sensor 24A (illustrated in FIG. 1A). It should be appreciated that the range of dithering and the number of cycles of dithering utilized can be different than the specific examples listed above.

It should be noted that the specific interrogation wavelengths utilized by the imaging microscope 12 will vary according to the sample 10 that is being analyzed. For example, the plurality of interrogation wavelengths that are used to identify whether a sample 10 is cancerous will differ from the plurality of interrogation wavelengths that are used to identify whether an sample 10 includes explosives.

Additionally, the number of interrogation wavelengths, required to effectively analyze a sample 10 can also vary according to the sample 10.

While a number of exemplary aspects and embodiments of an imaging microscope 12 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An imaging microscope for spectrally analyzing a sample, the imaging microscope comprising:
   a laser source that generates a coherent interrogation beam having a center wavelength that is in the mid-infrared region;
   an attenuated total reflection assembly that includes an ATR crystal and a sample holder that holds the sample in intimate contact with the ATR crystal; wherein the attenuated total reflection assembly is positioned to receive the interrogation beam at an incidence angle that exceeds a critical angle of the ATR crystal to generate an evanescent wave that enters the sample; wherein the interrogation beam is reflected by the ATR crystal to create a reflected beam that exits the ATR crystal;
   an objective lens assembly that collects the reflected beam and focuses the reflected beam, the objective lens assembly includes at least one refractive element; and
   a two dimensional image sensor that receives the focused, reflected beam and captures two dimensional image information that is used to generate an image of the sample, the image sensor being operable in the mid-infrared range.

2. The microscope of claim 1 wherein the objective lens assembly is a compound refractive objective lens assembly.

3. The microscope of claim 1 wherein a working distance between the ATR crystal and the objective lens assembly is less than fifty millimeters.

4. The microscope of claim 1 wherein the objective lens assembly has a numerical aperture of greater than or equal to 0.15.

5. The microscope of claim 1 wherein the objective lens assembly has a numerical aperture of greater than or equal to 0.3.

6. The microscope of claim 1 further comprising a stage, wherein the attenuated total reflection assembly includes an assembly retainer that selectively secures the attenuated total reflection assembly to the stage.

7. The microscope of claim 6 wherein the assembly retainer includes an alignment feature that aligns the attenuated total reflection assembly to the stage.

8. The microscope of claim 1 wherein the sample holder includes an off-axis clamping mechanism that urges the sample against the ATR crystal.

9. The microscope of claim 8 wherein the clamping mechanism includes a pivoting contact that distributes force uniformly across the sample.

10. The microscope of claim 1 wherein the attenuated total reflection assembly includes an assembly housing, a crystal housing that retains the ATR crystal, and crystal retainer that selectively secures the crystal housing to the assembly housing.

11. The microscope of claim 1 further comprising a control system that includes a processor that controls the image sensor to capture two dimensional image information at a rate of approximately thirty frames per second.

12. The microscope of claim 1 further comprising a control system that includes a processor that controls the image sensor to capture two dimensional image information at a rate of approximately sixty frames per second.

13. The microscope of claim 1 further comprising a control system that includes a processor that controls the image sensor to capture two dimensional image information at a rate of approximately one hundred and twenty frames per second.

14. The microscope of claim 1 further comprising a control system that includes a processor that controls the laser source to modulate the center frequency of the interrogation beam about a target wavelength during the capture of the two dimensional image information that is used to generate the image of the sample.

15. The microscope of claim 1 wherein the attenuated total reflection assembly includes a temperature controller for controlling the temperature of the ATR crystal.

16. A method for spectrally analyzing a sample, the method comprising:
   generating a coherent interrogation beam having a center wavelength that is in the mid-infrared region with a laser source;
   positioning the sample against an attenuated total reflection assembly that includes an ATR crystal and a sample holder that holds the sample in intimate contact with the ATR crystal;
   directing the interrogation beam at the ATR crystal at an incidence angle that exceeds a critical angle of the ATR crystal to generate an evanescent wave that enters the sample; wherein the interrogation beam is reflected by the ATR crystal to create a reflected beam that exits the ATR crystal;

collecting the reflected beam and focusing the reflected beam, with an objective lens assembly, the objective lens assembly includes at least one refractive element; and capturing two dimensional image information with a two dimensional image sensor that receives the focused, reflected beam; the two dimensional image information being used to generate an image of the sample, the image sensor being operable in the mid-infrared range.

17. The method of claim 16 wherein the collecting the reflected beam includes the objective lens assembly being a compound refractive objective lens assembly.

18. The method of claim 16 including positioning the objective lens assembly so that a working distance between the ATR crystal and the objective lens assembly is less than fifty millimeters.

19. The method of claim 16 wherein the collecting the reflected beam includes the objective lens assembly having a numerical aperture of greater than or equal to 0.15.

20. The method of claim 16 further comprising providing a stage, and selectively securing the attenuated total reflection assembly to the stage with an assembly retainer.

* * * * *